United States Patent [19]

Rudd

[11] 4,033,678

[45] July 5, 1977

[54] TWO-MIRROR SYSTEMS FOR PERISCOPIC REARWARD VIEWING

[76] Inventor: Milo O. Rudd, 2119 NE. 15 Terrace, Fort Lauderdale, Fla. 33305

[22] Filed: May 21, 1975

[21] Appl. No.: 579,365

[52] U.S. Cl. .............................. 350/302; 350/294; 350/301; 350/320

[51] Int. Cl.² .......................................... G02B 5/10

[58] Field of Search .......... 350/293, 294, 299, 301, 350/302, 307

[56] References Cited

UNITED STATES PATENTS

| | | | |
|---|---|---|---|
| 1,785,347 | 12/1930 | Herrschaft | 350/294 UX |
| 2,193,217 | 3/1940 | Allen | 350/301 X |
| 2,296,943 | 9/1942 | Okolicsany | 350/294 X |
| 2,942,522 | 6/1960 | Merriam | 350/294 |
| 3,224,330 | 12/1965 | Kompfner | 350/294 UX |
| 3,353,893 | 11/1967 | Bamberger et al. | 350/294 X |
| 3,762,794 | 10/1973 | Arnaud | 350/294 X |

*Primary Examiner*—F. L. Evans
*Attorney, Agent, or Firm*—Kane, Dalsimer, Kane, Sullivan and Kurucz

[57] ABSTRACT

An optical system comprised of two cylindrically concave mirrors provides an advantageous rearward viewing device. Light rays from the object field to the rear proceed to a first mirror at the side of or above the observer, then to a second mirror forward of the observer, and then to the eyes of the observer. The mirror orientations and shapes are so determined as to produce cooperatively a suitably sharp, undistorted, and unreversed view to the rear over a usefully large angular extent. Comfortable binocular vision is obtainable along with latitude for movement of the observer's head. The system is particularly suited for use as a rearview periscope for vehicles. Examples of its use are given, along with procedures for determining the system designs which are applicable to a wide range of installation requirements.

19 Claims, 36 Drawing Figures

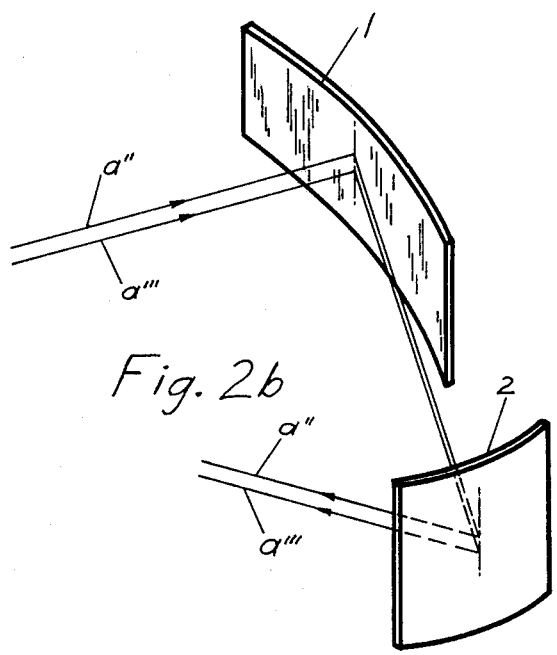
Fig. 2b
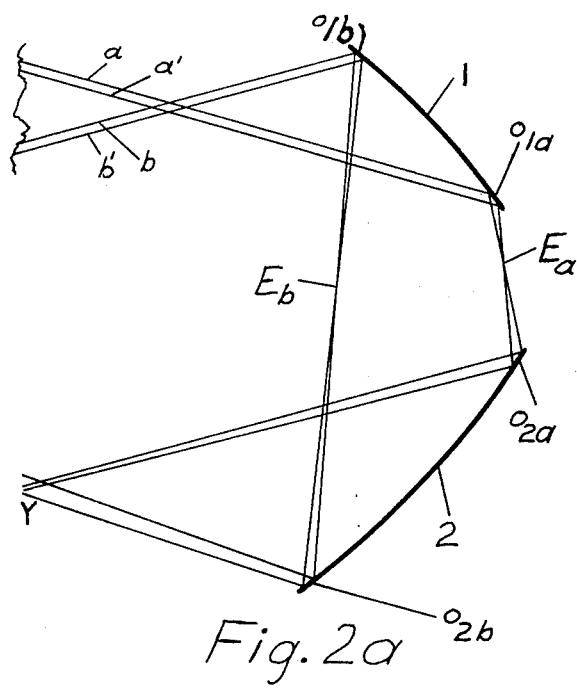
Fig. 2a
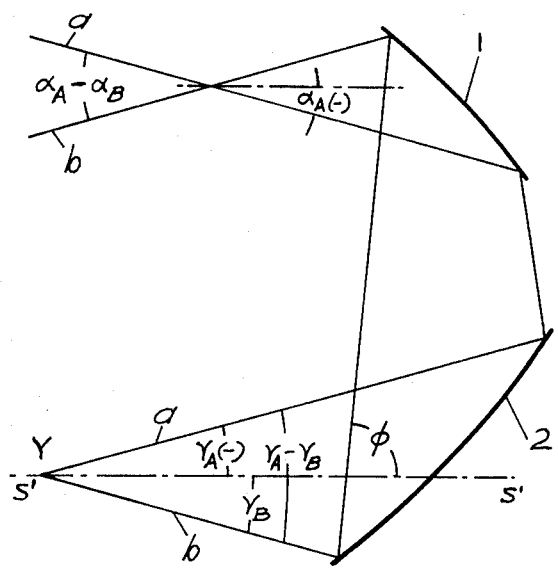
Fig. 3
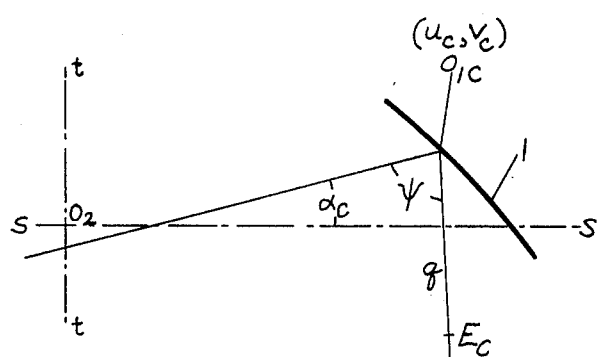
Fig. 4
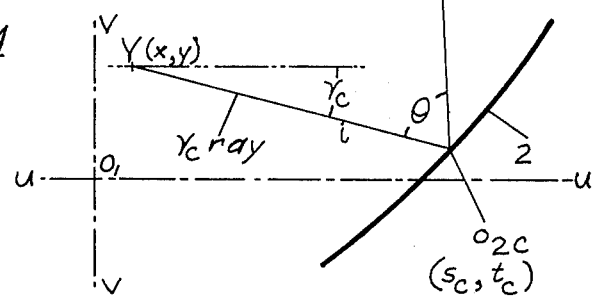

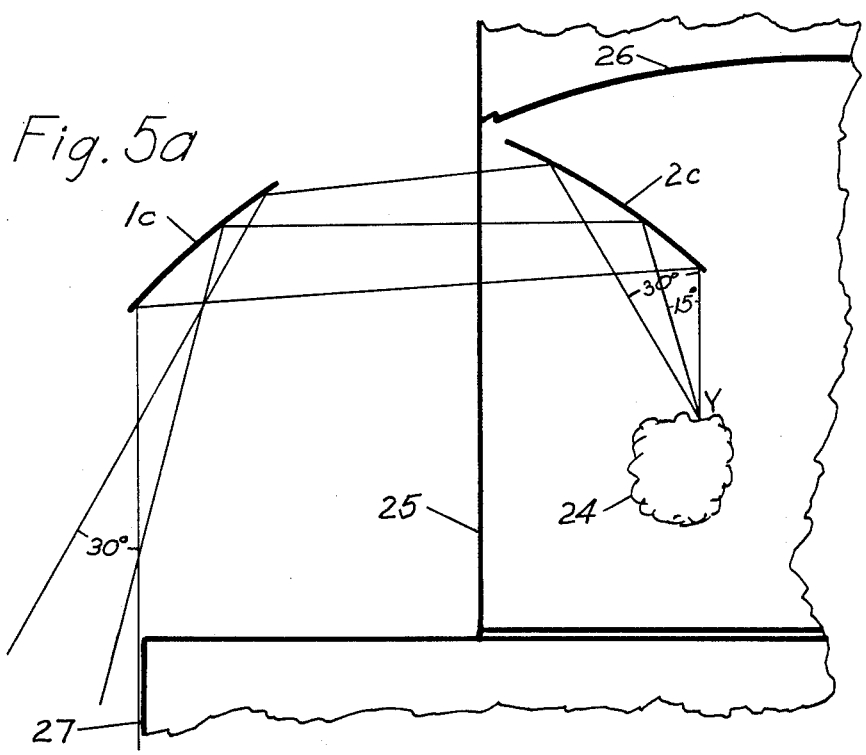
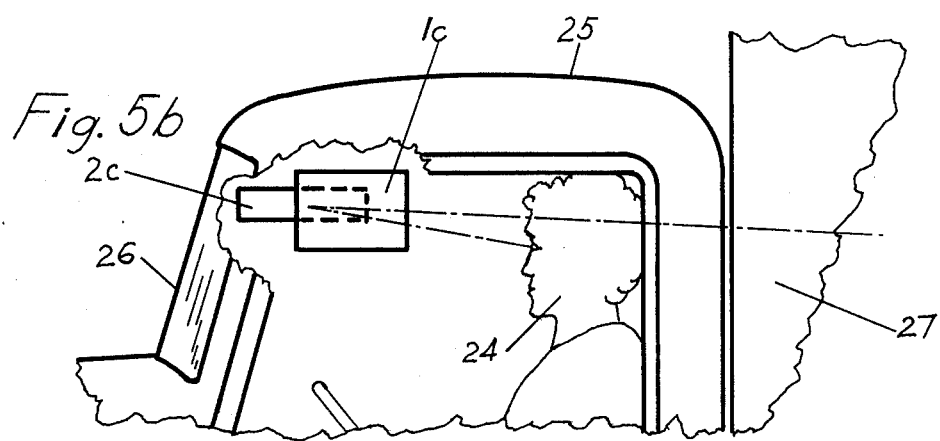
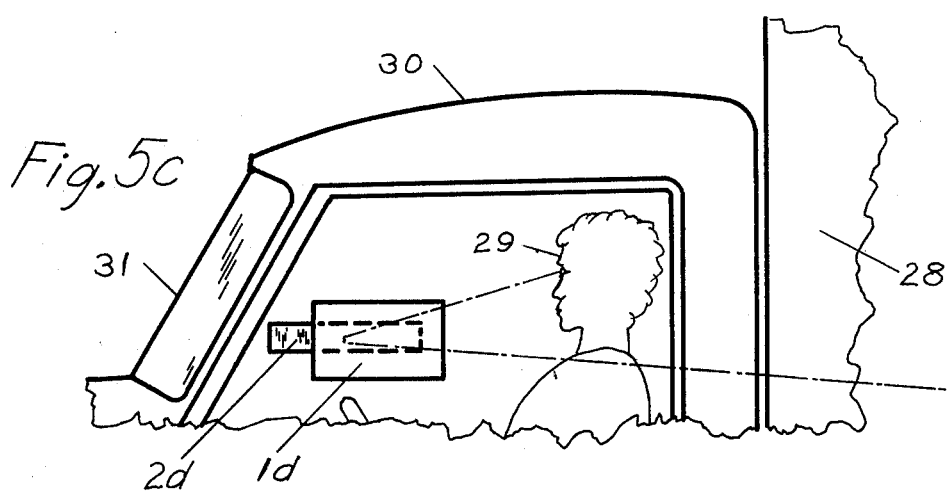

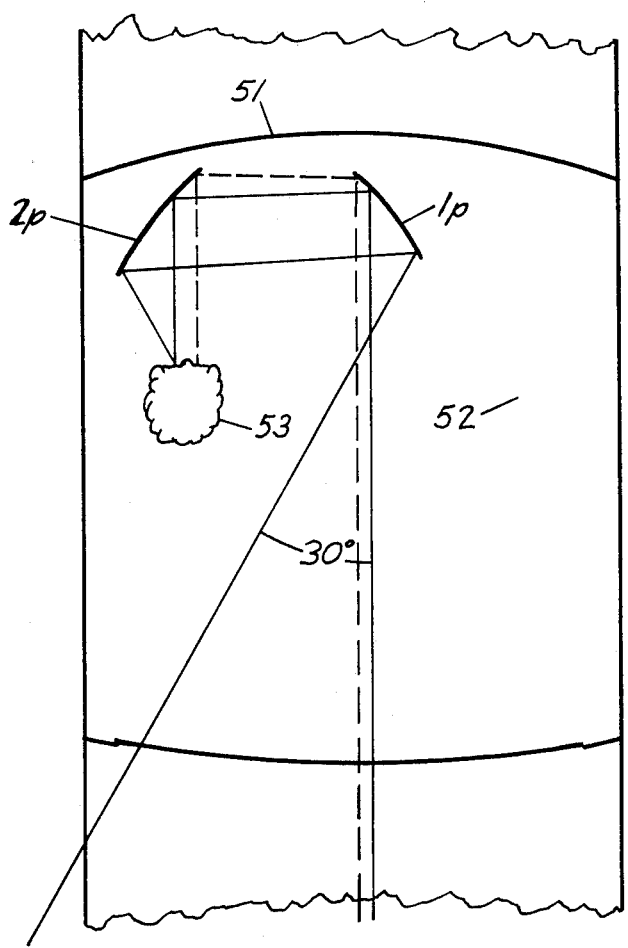
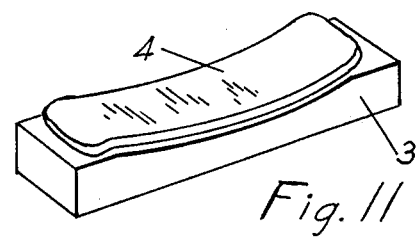
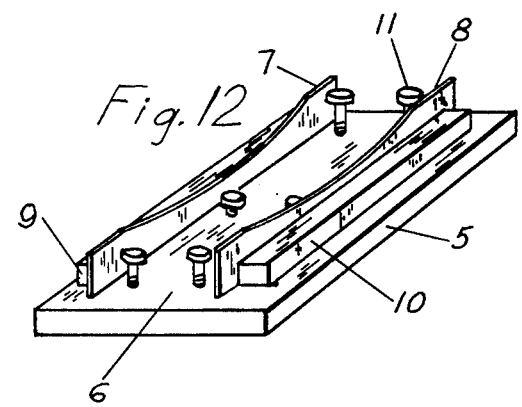
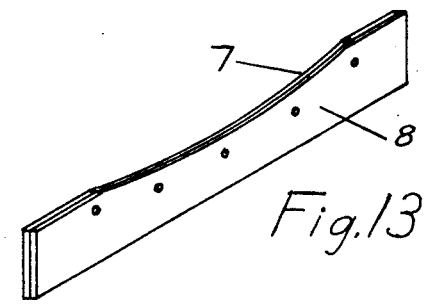
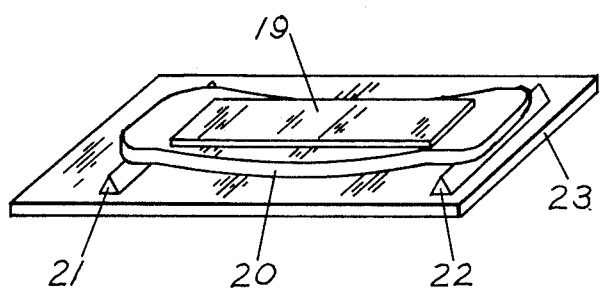
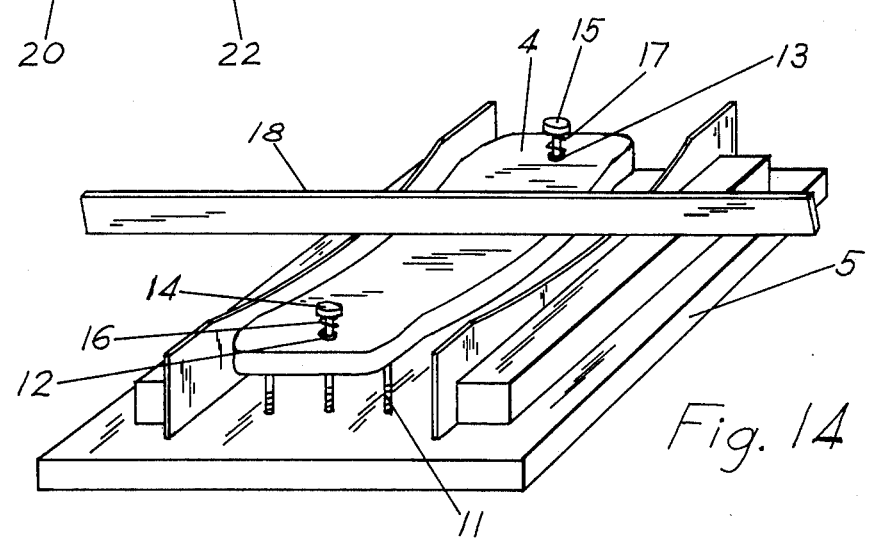

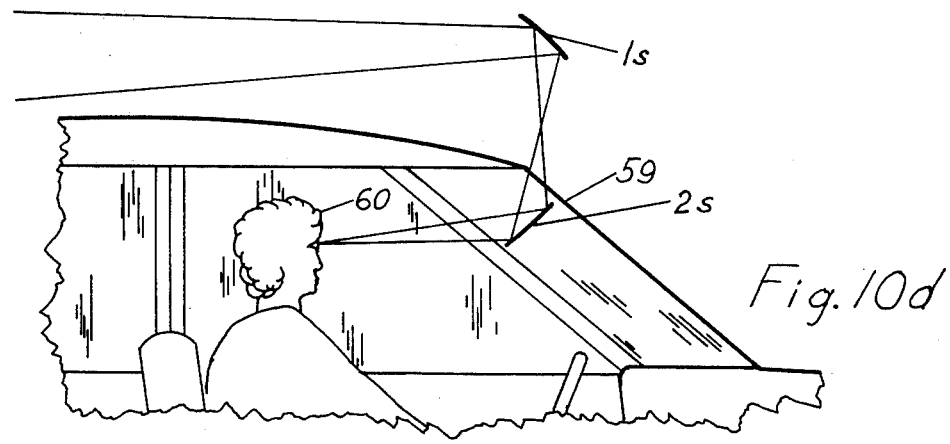
Fig. 10d
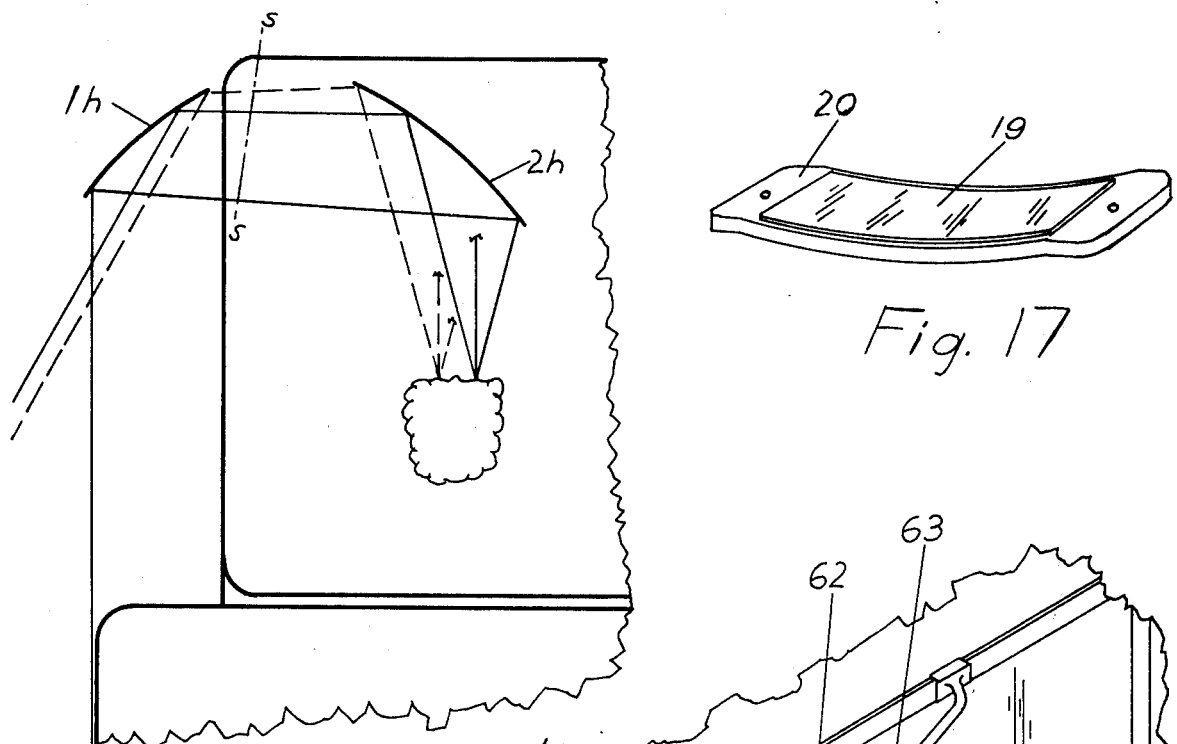
Fig. 16
Fig. 17
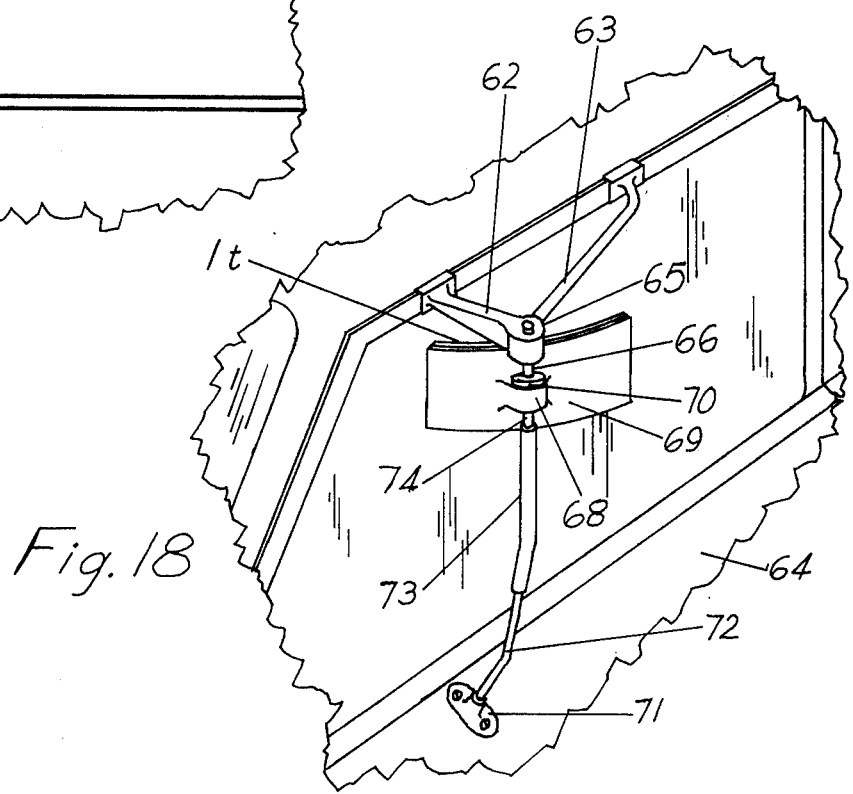
Fig. 18

TWO-MIRROR SYSTEMS FOR PERISCOPIC REARWARD VIEWING

The safe handling of a vehicle requires an adequate view to the rear. The single rear-view mirror has handicaps which all operators have experienced. Regardless of its horizontal extent, a single mirror which is forward of the operator, but within the passenger compartment, suffers from having important areas of view blocked out by the structure of the vehicle, the passengers, and the operator himself. The objections to an outside single mirror, such as a too-limited field of view, are well known to all drivers. The need for the operator to divert the direction of his gaze from the traffic ahead causes a real driving hazard, especially with the outboard mirror positions required with wide-bodied trucks, campers, and other vehicles.

Interference with the view to the rear may be avoided by the use of a periscope arrangement which routes the line of sight around the obstructions. However, when two flat mirrors are used for a periscope, the view is reversed in one direction. A periscope comprised of three flat mirrors avoids the reversal problem but becomes bulky, difficult to mount and expensive. Spherically convex mirrors which are mounted outside of the passenger compartment give a large field of view, but the reduction in apparent size of the road and traffic to the rear can result in misjudgements of distance and speed. Periscope arrangements involving combinations of lenses and mirrors have been conceived by others, but the use of such devices has been restricted by structural problems, high costs, and, frequently, optical difficulties which led to unsafe interpretations of the traffic situations presented.

I have invented a novel optical system comprised of two concave cylindrical mirrors which, when incorporated in a rear view device for vehicles, avoids the objectionable features associated with presently used devices. This mirror system provides an erect and unreversed view of the object field to the rear. It is capable of providing an extended field with sharp, undistorted vision throughout. The system is further capable of providing for satisfactory binocular viewing. It also permits the vehicle operator to shift his head a reasonable amount without causing objectionable impairment of the periscopic view.

The mirror system is versatile in that it can be accommodated to various configurations as desired. Thus, the system can provide for periscopic views (1) to the left and rearward, (2) to the right and rearward, and (3) over the top of the vehicle and to the rear. By adopting mirror locations which are suited to the vehicle under consideration, a view of the road and traffic to the rear may be achieved which is far superior to that available with the rear devices in present use.

Design variations in the novel two-mirror optical system which I have invented can accomplish the above mentioned advantages and flexibility through the use of a mathematical procedure I have developed. The method leads, in direct steps, to useful and optimum designs for an almost limitless variety of installation requirements.

Other advantages of my two-mirror system will be evident from a study of the following descriptions, examples, and illustrations.

In the drawings:

FIG. 2a shows diagrammatically the ray paths of narrow bundles of rays through the mirror system of my invention.

FIG. 2b shows the paths of other rays through my mirror system.

FIG. 3 shows the angles and mathematical symbols associated with field angles in the object and image fields.

FIG. 4 is a diagram showing the route of a single typical ray through a mirror system and gives the mathematical symbols used in its analysis.

FIG. 5a shows schematically and in plan view the configuration of one of my mirror systems installed in the cab of a wide-bodied vehicle.

FIG. 5b shows a cut-away view in the left side elevation of the installation of FIG. 5a.

FIG. 5c shows, in left side elevation, an alternative placement of the mirrors of my system for use with the arrangement shown in FIG. 5a.

Figure 7A:
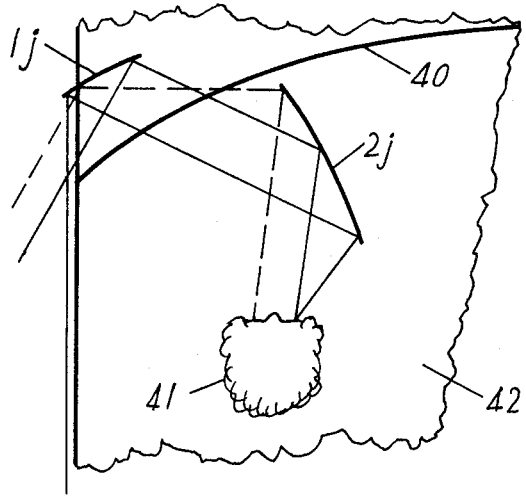
Figure 7C:
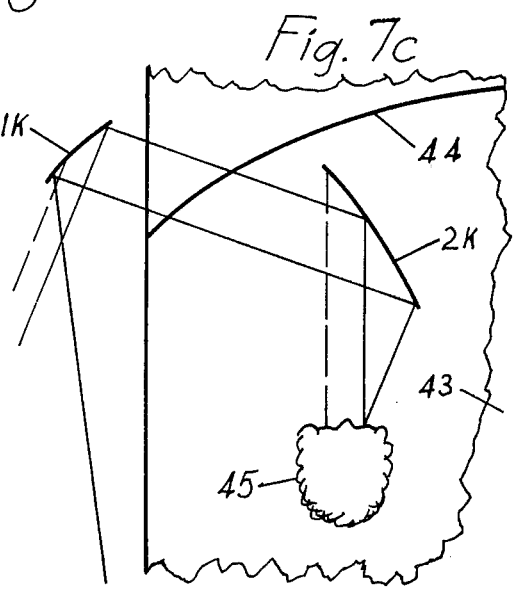
Figure 7B:
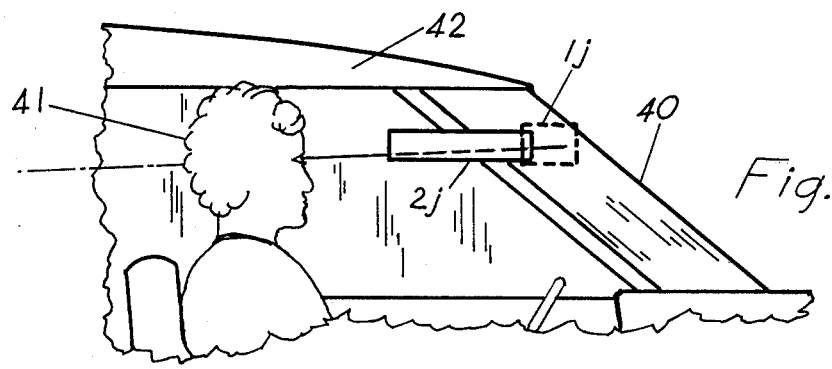
Figure 7D:
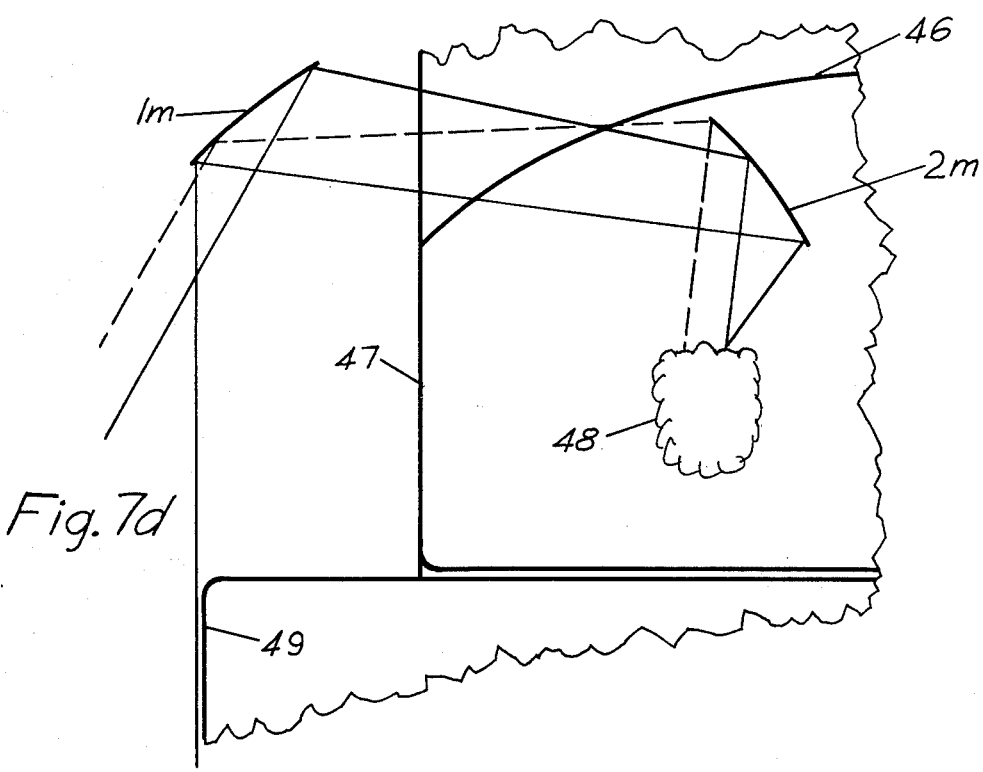

FIGS. 7a, 7c, and 7d show, schematically and in plan view, mirror installations in which the outer mirror is forward of the vehicle windshield.

FIG. 7b is a right side elevation showing schematically the placement of the mirrors shown in other views in FIGS. 7a, 7c, and 7d.

Figure 8:
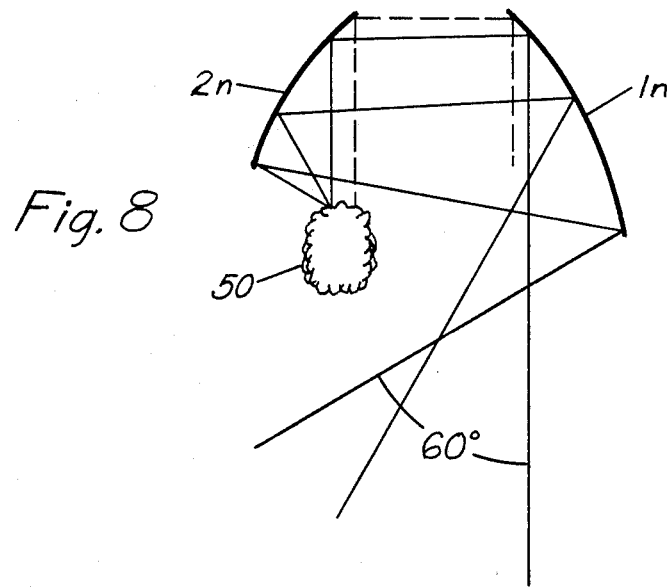

FIG. 8 is a ray diagram depicting a mirror system in accordance with my invention which affords an extremely wide angle of view.

FIG. 9 shows, schematically and in plan view, how the system shown in FIG. 8 can be adapted for use within a vehicle.

Figure 10A:
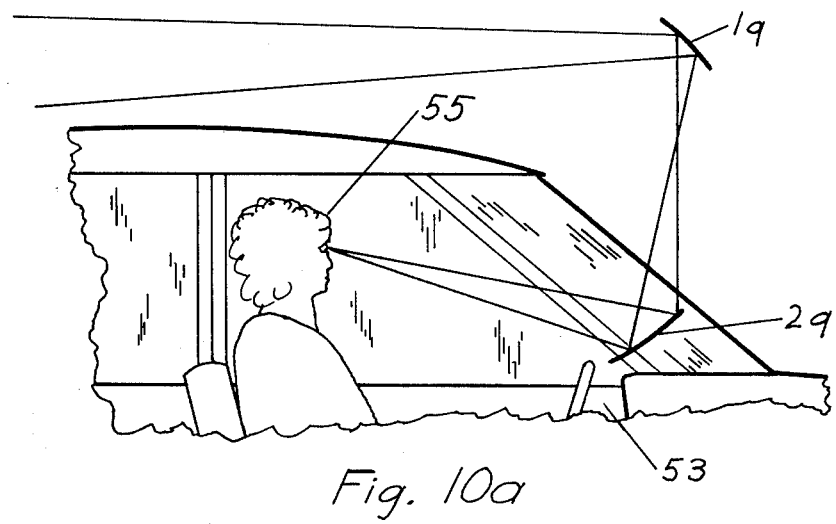
Figure 10B:
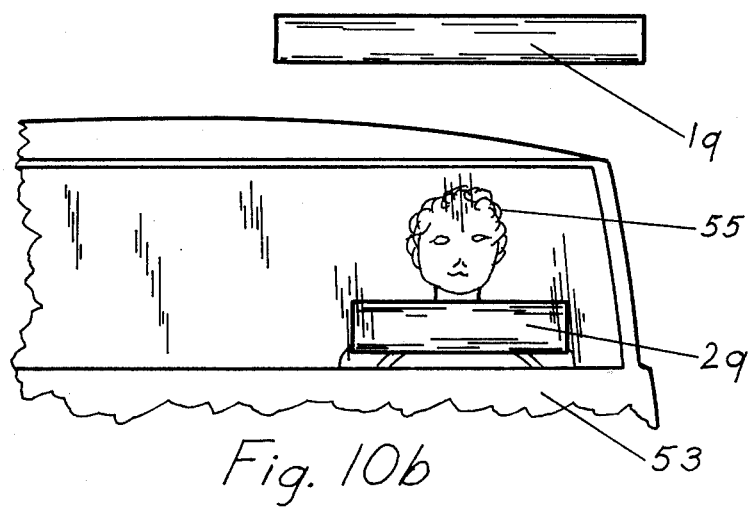
Figure 10C:
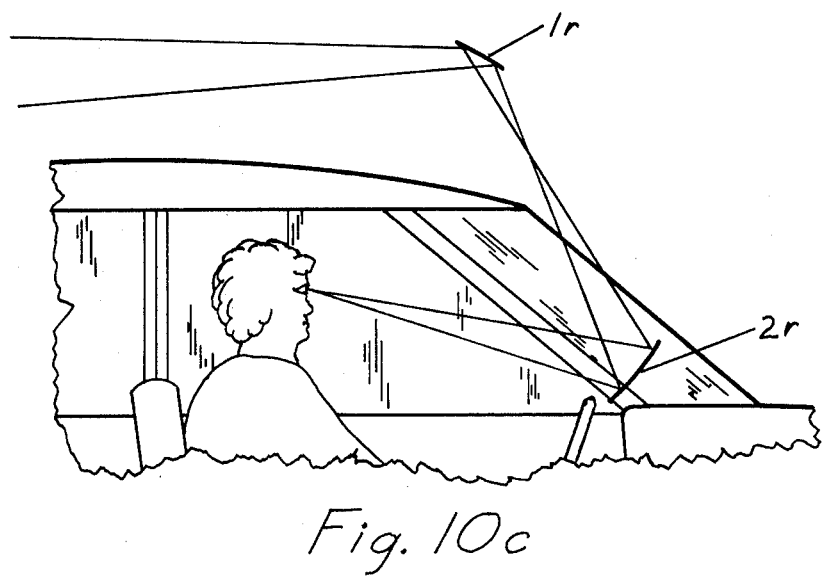

FIGS. 10a, 10c, and 10d show, schematically and in right side elevation, the mirror arrangements used in another application of my invention. FIG. 10b is a front elevation of the arrangements of FIGS. 10a and 10c.

FIG. 11 is a perspective drawing showing one of the preliminary stages in the production of mirrors in accordance with my invention.

FIG. 12 is a fixture useful in a preliminary operation in the making of my cylindrical mirrors.

FIG. 13 shows a stage in the making of templates used in the production of my cylindrical mirrors.

FIGS. 14, 15, and 17 show further stages involved in the production of my cylindrical mirrors.

FIG. 16 shows, schematically and in plan view, a mirror system arranged for use in a wider cab on a widebodied truck or other vehicle.

FIG. 18 shows, schematically and in perspective, a means for mounting the outer mirror of one of my systems on the left side door of a vehicle.

Figure 19:
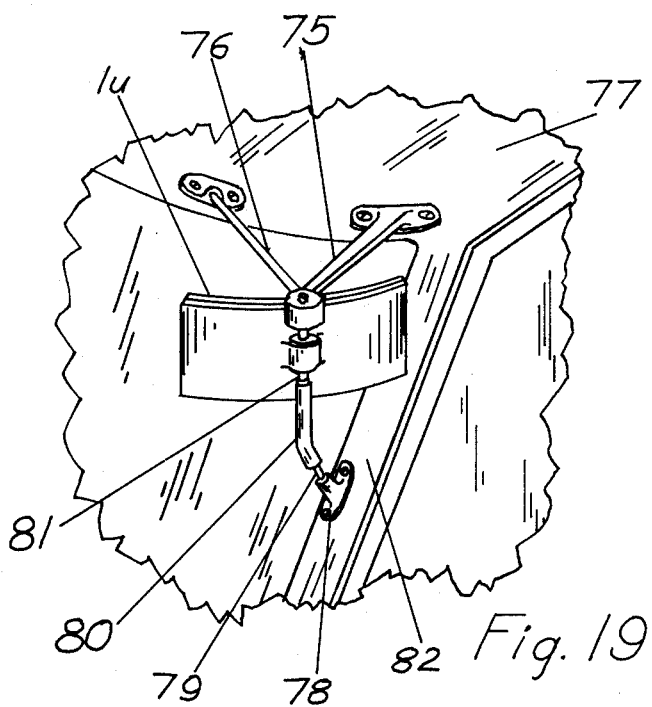

FIG. 19 shows the manner in which the outer mirror of another of my systems may be mounted forward of the vehicle windshield.

Figure 20:
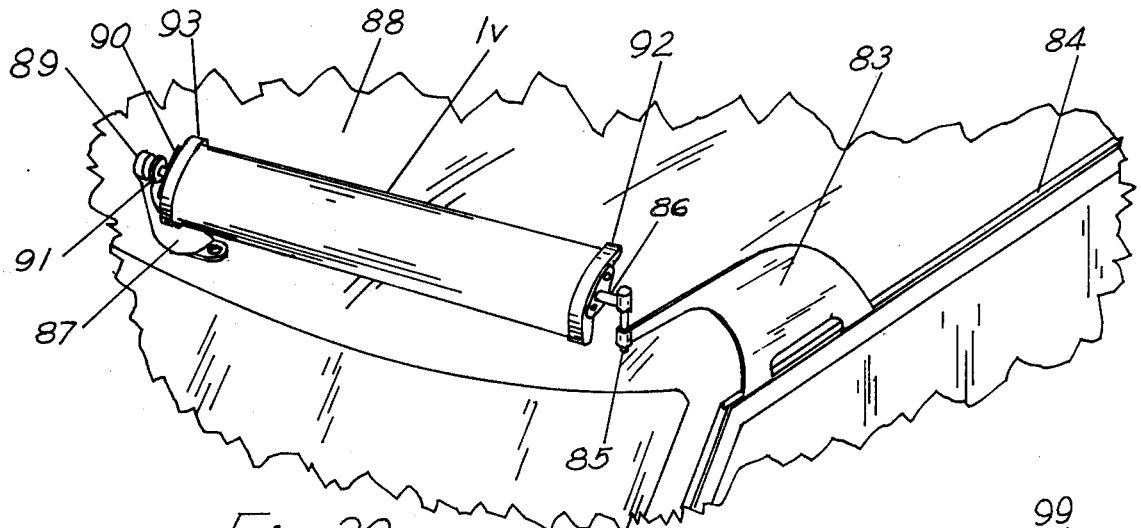

FIG. 20 shows, schematically and in perspective, a means for mounting the upper mirror of another of my mirror systems in a position above the vehicle windshield.

Figure 21:
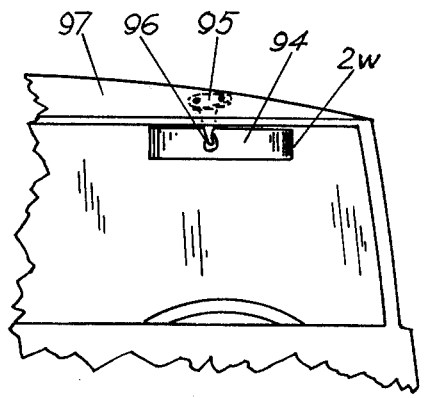

FIG. 21 is a schematic view in front elevation which shows a mounting means for the inside mirror as used in several of my arrangements.

Figure 22:
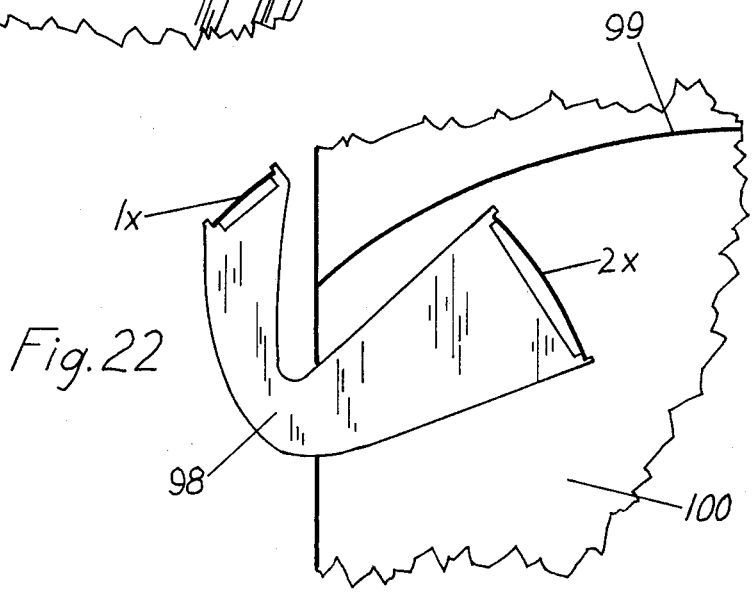

FIG. 22 is a schematic view of a template as used for the purpose of aligning the mirrors of one of the systems.

Figure 23:
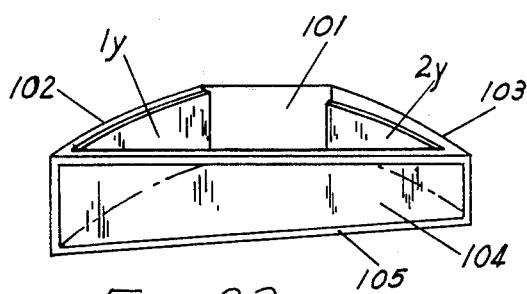
Figure 24:
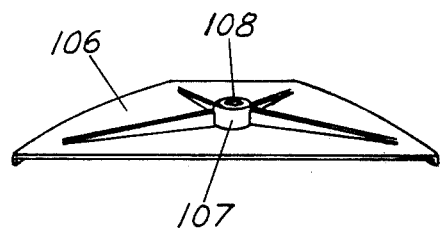

FIG. 23 is a perspective view of an assembled housing which is to be fastened to the top member as shown in FIG. 24 to form an enclosure which may be mounted as a single unit.

Figure 25:
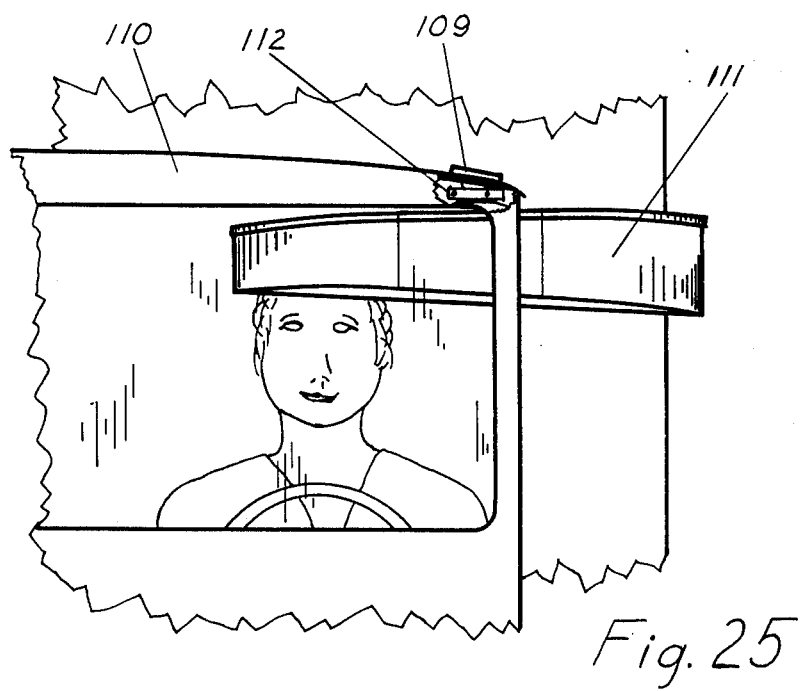

FIG. 25 shows, schematically and in front elevation, a means by which the enclosure of FIGS. 23 and 24 may be supported from the roof of a vehicle.

Figure 26:
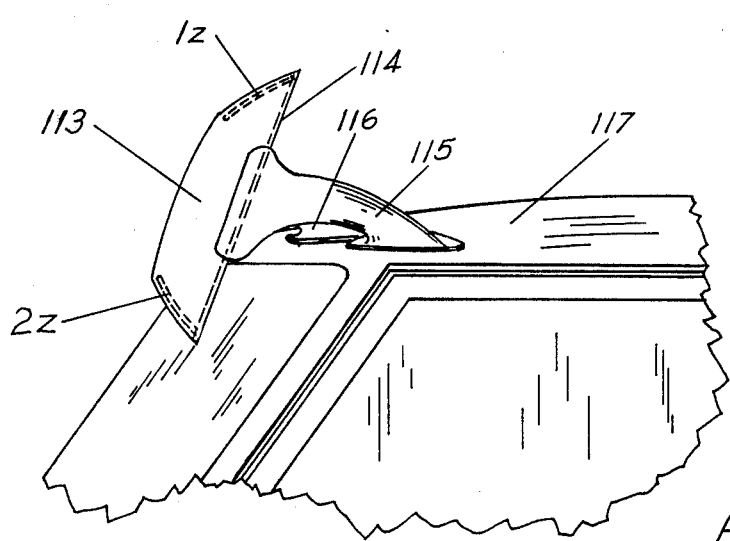

FIG. 26 shows a means for mounting the mirrors of another arrangement in a single enclosure and for mounting the enclosure on a vehicle roof.

The optical requirements which a two-mirror system must meet in order to perform successfully as a rear view device for a vehicle are these:

1. Image erect and unreversed, as is the case with single, flat rear-view mirrors.
2. An unobjectionable amount of astigmatism throughout the desired field of view.
3. Unit (life-size) magnification with substantial freedom from distortion throughout the field. (The remaining primary aberrations, including spherical aberration and coma, have been determined to be negligible in amount owing to the small size of the eye pupil relative to the other distances involved.)
4. A field of view of adequate angular extent, especially in the horizontal direction.
5. Convergence properties suitable for comfortable binocular viewing.
6. Reasonable latitude in the amount by which the observer may shift his head while still obtaining a satisfactory view.
7. The image view is not presented too far to the side of the observer.

Figure 1A:
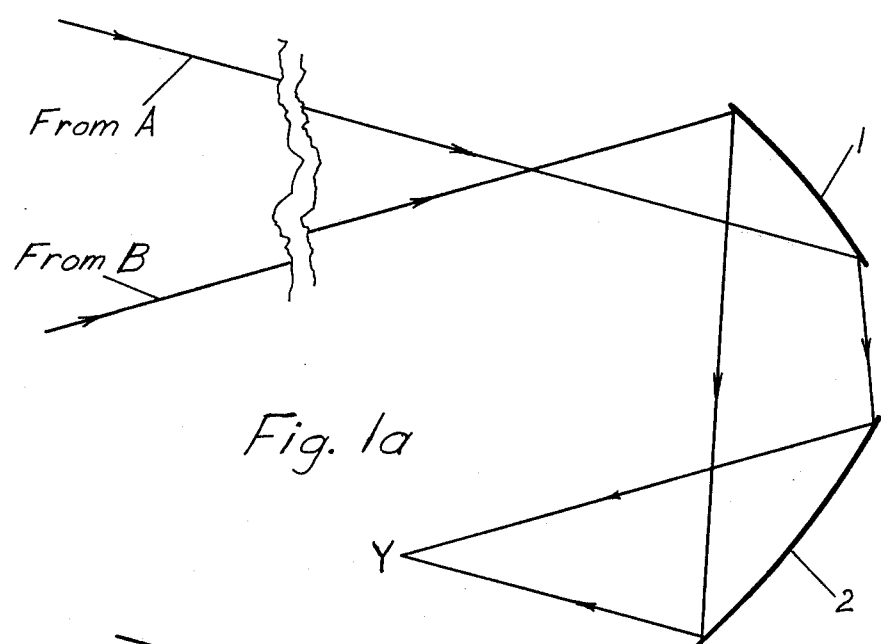
FIG. 1a is a ray diagram showing the path of field rays through the mirror system of my invention.

By following the design principles and procedures which I have invented and developed, the above requirements can all be satisfactorily met.

to meet the requirements that the image provided by the mirror system be erect and unreversed, I use two cylindrically concave mirrors which are angled and spaced as shown schematically in FIG. 1a, where the mirrors 1 and 2, greatly reduced in scale, are shown in sections perpendicular to their cylinder axes, the axes being substantially parallel. The action of the spaced concave cylindrical surfaces in providing the required unreversed image may be understood by studying the paths of rays from the indicated object points at A and B, noting that the rays from object B, which may be taken as being on the right side of object point A, appear to come from the right side of the image field to the pupil of the eye at Y, as they should.

Figure 1B:
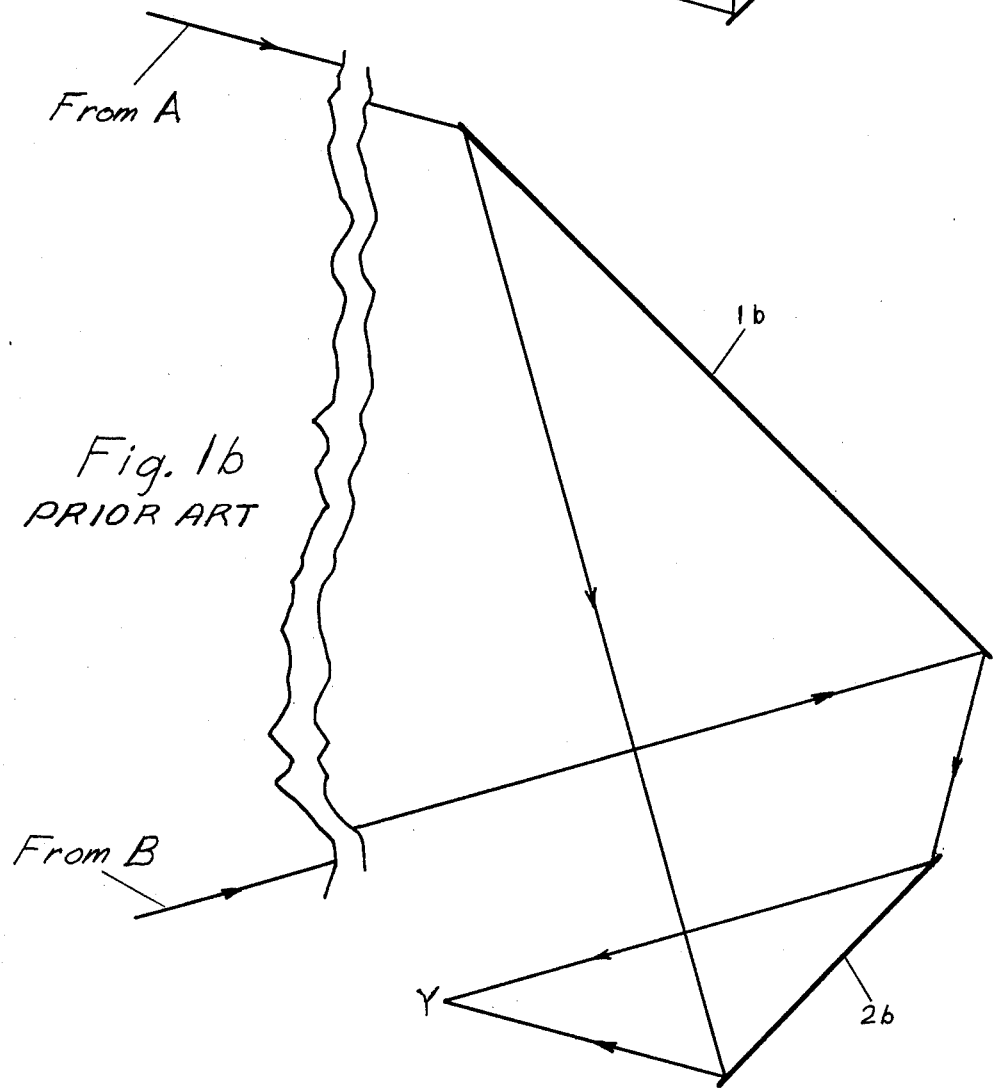
FIG. 1b is a similar ray diagram which shows the path of field rays through a system having two flat mirrors.

FIG. 1b indicates the paths of the rays from the same pair of object points, A and B, which result when two flat mirrors 1b and 2b are employed. The object is seen to be reversed right for left in this case.

The paths of light rays which lie in, or are projected onto, a plane which is parallel to the cylinder axes of the concave mirrors are reflected in a plane in which the mirror cross-sections are not curved. No reversal of the image occurs in the direction parallel to the cylinder axes, which is as required.

While two spaced cylindrically concave mirrors can produce an image which is properly unreversed and erect, such mirrors used singly form reflected images which are grossly distorted and blurred. My invention comprises in part the concept of correcting the aberrations which are inevitably present with one cylindrical mirror through the addition of a second mirror whose aberrations can be made to eliminate substantially those of the first mirror.

The optical system represented schematically and in section by FIG. 1a can, unless carefully designed, have enough astigmatism to result in unacceptable amounts of blurring. The astigmatism is caused by the difference between the reflective paths of a bundle of light rays lying in, or projected onto, a plane perpendicular to the cylinder axes (which rays experience a convergence due to the action of the concave reflecting surfaces) and the paths of a bundle of reflected rays lying in, or projected onto, a plane parallel to the cylinder axes (which rays experience no converging action). FIG. 2a is a sectional view in which the cylinder axes of mirrors 1 and 2 are perpendicular to the plane of the paper and in which closely spaced parallel light rays $a$ and $a'$ from a distant object point A lie in, or are projected onto, a plane which is parallel to the plane of the paper. The converging action of the concave mirror surface 1 causes the rays $a$ and $a'$, in their paths between mirrors 1 and 2, to cross at point $E_a$. They then diverge until they impinge upon mirror 2. The concave curve of mirror 2 causes the rays to be directed toward the pupil Y at the viewing position with, in general, some convergence (as shown), or divergence.

In FIG. 2b, the paths of light rays $a''$ and $a'''$, in the same small parallel bundle which contains rays $a$ and $a'$, are shown in perspective as they proceed from the object point A through the mirror system of FIG. 2a. The rays $a''$ and $a'''$ lie in planes which are parallel to the cylinder axes. Because the mirror sections are not curved when they are taken parallel to the cylinder axes, the paths of the rays $a''$ and $a'''$ in this view remain parallel to each other throughout until they enter the observer's eye. To achieve control of astigmatism, the paths of the rays $a$ and $a'$ of FIG. 2a must also be substantially parallel as they enter the observer's eye.

The avoidance of astigmatism in the image of the object point A requires that the curvatures of the mirror surfaces at $o_{1a}$ and $o_{2a}$ in relation to the distance between $o_{1a}$ and $o_{2a}$, and to the angles between path $o_{1a} - o_{2a}$ and the tangent planes to the mirror surfaces at $o_{1a}$ and $o_{2a}$, be so chosen that the rays $a$ and $a'$ are substantially parallel as they proceed from $o_{2a}$ to Y. (For clarity, the separation between the limiting rays $a$ and $a'$ which can enter the pupil at Y from object point A is shown greatly exaggerated. I have found that only a trivial amount of inaccuracy results from treating the ray bundle $a - a' - a'' - a'''$ mathematically as a bundle of zero diameter surrounding the central ray travelling from A to the center of the pupil Y.)

While the removal of astigmatism in the ray bundle from a single object point A may be readily achieved through appropriate choices of the curves, separations, and angling of both mirrors, in general the rays from another object point, such as that at B, will be afflicted with an undesirable amount of astigmatism. Thus, the rays $b$ and $b'$ are converged by mirror surface 1 to a point $E_b$ and then diverge to their points of incidence with mirror 2. However, they will usually have arrived at a portion of the surface of mirror 2 which is not correctly curved and angled in relation to the separation between $E_b$ and $o_{2b}$ to cause their paths to be substantially parallel between $o_{2b}$ and Y. They will consequently arrive at the pupil of the eye either in a converging or a diverging manner, thus producing astigmatism.

The requirement for unit magnification, which means that the image of the object field appears life-size, is a highly desirable one from the standpoint of safe operation. The use of spherically convex mirrors, while providing a desirably large extent of image field, represents a distinct hazard in that the resulting magnification, being less than unity, presents objects in improper scale and with velocities of movement which are difficult to judge.

Referring to FIG. 3, which indicates the paths of the central rays from object points A and B after they are projected onto a plane perpendicular to the cylinder axes of the mirrors, the angle $\gamma_A - \gamma_B$ requires to be substantially equal to the angle $\alpha_A - \alpha_B$ in order that the unit magnification requirement be met. Besides meeting this requirement for unit magnification between a particular pair of object points A and B, the same substantial equality must be obtained for pairs of object points selected from any positions within the intended field of view. The meeting of this requirement also results in the image field being substantially free from distortion.

I have found that, through the use of the design procedures which I have developed and which will be set forth later, I can arrive at mirror orientations and shapes which will simultaneously meet the demands of satisfactorily reduced astigmatism and substantially unit magnification with little distortion throughout a field of view of useful extent, say in the neighborhood of 30° or more in the horizontal direction.

This excellent image quality can be obtained with the mirrors 1 and 2 arranged and mounted with their cylinder axes substantially parallel and vertical, in which case the wider, horizontal extent of the image field is oriented in a direction perpendicular to that of the cylinder axes, or with their cylinder axes substantially parallel and horizontal, in which case the wider horizontal extent of the image field is oriented in a direction parallel to that of the cylinder axes, or with the cylinder axes substantially parallel and tilted in any desired direction.

While beneficial results could be obtained through the monocular use of such a device as has been described in the foregoing, binocular viewing is preferrable because of the added comfort in use. Special attention must be paid to the binocular requirements when the mirror arrangement is that with the cylinder axes approximately vertically disposed and the maximum field extent in the horizontal direction. With these orientations, the mirror design must satisfy the requirement that the rays through the system from a distant object point arrive at the left eye of the observer from a direction which is substantially parallel to that from which they arrive at the right eye. In practice, the requirement for comfortable binocular viewing is that the light paths from an object point, in that space where they are proceeding from mirror 2 to the centers of the pupils of the two eyes of the observer, may be somewhat divergent but not convergent by more than a slight amount, perhaps one-half degree. This binocular convergence requirement has been met by the designs I have developed following the design procedure to be described later.

In addition to solutions to the several design problems just discussed, a successful design must provide leeway for the observer to move his viewing position from right to left, from front to back, and up and down, without affecting the utility of the view which is presented. The design procedure as developed permits a ready assessment of such latitudes of movement. Some types of cylinder curves used with a mirror system provide for this ability to shift eye positions to greater extents than do others. For each of the vehicular applications which I have studied to date, a system design was arrived at which provided for adequate head movement without serious impairment of the image quality.

DESCRIPTION OF DESIGN PROCEDURE

In the following discussion of the procedures which I have developed for the determination and evaluation of particular mirror configurations I use the symbol S to represent astigmatism and define S as follows:

Expressed in the usual diopter units, $$S = \frac{q - f_1 - f_2}{(q - f_1)f_2} \times 1000 \tag{1}$$

where the converging length $f_1$ is a quantity analogous to the focal length of a refracting lens and is the distance from mirror 1 to the point at which a zero diameter bundle of parallel light rays, lying in a plane perpendicular to the mirror axis and coming from the direction of the object point under consideration and ultimately reflected to reach the center of the pupil of the observer, is converged after its reflection by mirror 1, the converging length $f_2$ is the distance from mirror 2 to the point at which a zero diameter bundle of parallel light rays, proceeding backwards from the center of the pupil of the observer along the same path, is converged after its reflection by mirror 2, and $q$ is the distance along the same path between the points of incidence of the ray bundle on the mirrors 1 and 2. The quantities $f_1$, $f_2$ and $q$ are measured in millimeters.

The converging lengths $f_1$ and $f_2$ are controlled not only by the curvatures of the mirrors 1 and 2 but also by the angles of incidence of the ray bundles on the mirror surfaces. I have established that the converging length $f$ is determined exactly by the relation:

$$f = \frac{r \cos \beta}{2} \tag{2}$$

where $r$ is the instantaneous radius of curvature of the mirror at the point of incidence of a zero diameter ray bundle which is incident on the mirror at angle $\beta$, $\beta$ being measured from the normal to the mirror surface. By substituting the value of $f$ from (2) in equation (1), we obtain the expression used in calculating the value of S:

$$S = \frac{q - \frac{r_1 \cos \beta_1}{2} - \frac{r_2 \cos \beta_2}{2}}{\left(q - \frac{r_1 \cos \beta_1}{2}\right)\frac{r_2 \cos \beta_2}{2}} \tag{1a}$$

I represent distortion by the symbol D and define D so that it indicates the percentage by which the field area under study departs from unit magnification:

$$D = \frac{(\gamma_B - \gamma_A) - (\alpha_B - \alpha_A)}{(\alpha_B - \alpha_A)} \times 100\% \tag{3}$$

where $\gamma_B-\gamma_A$ is the angle subtended by the central rays of the bundles entering the pupil of the eye from points B and A and the quantity $\alpha_B-\alpha_A$ is the angle between the same central rays as they proceed from object points B and A toward mirror 1. Defined in this manner, a value of D of +5% would mean that an object which was 100 units square would be perceived as a rectangular image 100 units by 105 units in extent.

The amount of astigmatism as defined and determined by the quantity S in the expression (1a) provides a measure of astigmatism which is directly comparable in visual effect with that used professionally in connection with ophthalmic lenses. The distortion value D, as defined and determined by the expression (3), is in a form frequently used in the design and evaluation of optical lenses of all types. The values of S and D are used throughout the discussion which follows to represent system performance for astigmatism and distortion respectively.

Many different expressions for and means of describing the amounts of astigmatism and distortion are used by optical designers. However, the definitions and expressions I have developed and set forth above have been found to be adequate and particularly suited for the design work on my mirror systems.

Referring to FIG. 3, $\gamma_A$ designates the image field angle of the "projected central ray" from an object point A as measured from a reference axis $s'-s'$ related to the curve of mirror 2 in a section perpendicular to its cylinder axis. (The term "projected central ray", as used above and in what follows, refers to the projection, onto a plane perpendicular to the cylinder axes of the mirrors, of the central ray of a bundle which goes through the pupil at the observing position. Because we are dealing throughout the design work with cylindrical surfaces which, by definition, are not curved in the direction parallel to the cylinder axes, no loss in generally or accuracy is involved in this manner of treating rays which do not lie in planes perpendicular to the cylinder axes.)

A perfectly performing system would be indicated by S = 0 for all values of the field angle $\gamma$ from one edge of the field to the other, and D = 0 for all values of $\alpha_A - \alpha_B$. Curved mirror systems of the type under consideration here are, however, true optical systems and, as such, can never be totally free from small amounts of distortion and astigmatism over fields of useful extent. They can, nevertheless, through following the design principles set forth in this exposition, be so designed as to reduce these aberrations to the point where they do not distract or confuse the vehicle operator.

The values of S and D which are found through my developed analytical procedure to be associated with the various field angles $\gamma_A$, $\gamma_B$, $\gamma_C$ . . . . etc. suffice to describe adequately the image quality obtainable with the system under study. Further, by finding S and D values which result from a simulated shift in the position of the pupil equivalent to the pupillary distance, the suitability of the design for binocular vision can be predicted. The amount of movement of the observer's head which is possible before optical performance suffers objectionably can be determined in a similar manner. The use of S and D values also serves to describe the effect of tilting one or both of the mirrors in order to accommodate for the different head positions of different vehicle operators.

To better carry out the performance evaluations of my systems of concave mirrors, I have devised a mathematical procedure for the orderly and effective determination of amounts of astigmatism and distortion. The procedure will be seen to be well adapted to the computing of the S and D values which are associated with a variety of mirror curvatures, separations, and angles. The design procedure may be briefly summarized as follows:

1. Determine, by direct measurement or by graphical layout, the required distances $i$ from the pupil position Y to mirror 2 and $q$ from mirror 2 to mirror 1 along the path of a selected field ray $\gamma_C$ (see FIG. 4), usually the ray from the center of the intended object field.

2. From the intended position of the pupil relative to the two mirrors and to the object field to be covered, determine, by simple geometry and the equating of the angel of incidence with the angle of reflection, the angular positions of the mirror surfaces at points $o_{1C}$ and $o_{2C}$ which will cause the ray $\gamma_C$ to be reflected so that the angles $\theta$ and $\psi$ have the necessary values.

3. Equate the sum of the converging lengths $f_{1C}(=o_{1C}E_C)$ and $f_{2C}(=o_{2C}E_C)$ with the distance $q$. This is the condition for zero astigmatism, (S = 0), for the projected central ray at the field angle $\gamma_C$. This condition will result in parallel rays from the object at C being converged by the curvature of mirror 1 at $o_{1C}$ to the point $E_C$ and once more converged by the curvature of mirror 2 at $o_{2C}$ to enter the pupil at Y as parallel rays again.

4. Make the distortion ($D_C$) equal to zero for the field ray $\gamma_C$. This condition, which is the equivalent of unit magnification at the position of the image of object point C, requires that the distance $o_{1C}E_C$ ($=f_{1C}$) be equal to $E_Co_{2C}$ ($=f_{2C}$).

5. By using the quantities and relationships developed in steps 1 through 4, and including the further relationships:

$$f_{1c} = \frac{r_{o_{1c}} \cos \frac{1}{2}\psi}{2}$$

and $$f_{2c} = \frac{r_{o_{2c}} \cos \frac{1}{2}\theta}{2}$$

where $r_{o_{1C}}$ and $r_{o_{2C}}$ are the radii of curvature at $o_{1C}$ and $o_{2C}$ respectively, solve for the values of $r_{o_{1C}}$ and $r_{o_{2C}}$ which result in the required values of the converging lengths $f_{1C}$ and $f_{2C}$ simultaneously with the designated value of $q$.

6. Express the cylinder curves, in the planes perpendicular to their cylinder axes, as equations with two variables in rectangular coordinates. I have found it convenient to obtain solutions in a form which uses one set of coordinates, $u,v$, centered at $O_1$ with mirror 1, and another set, $s,t$, centered at $O_2$ with mirror 2.

7. With the data already developed, and using the coordinate system for mirror 2 centered 2 centered at $O_2$, determine the equation of the line representing the path of the central ray at field angle $\gamma_C$ from the pupil Y to mirror 2.

8. Find the intersection point ($s_C,t_C$) of this $\gamma_C$ ray with the curve of mirror 2 by the simultaneous solution of their equations.

9. Determine the coefficients of the equation of the curve of mirror 2 so that its slope angle at $(s_C, t_C)$, as found from the first derivative $g'$ of the mirror equation, results in $\theta$ having the required value, and so that $r_{o_{2C}}$ has a value which results in the required value for $f_{2C}$. The value for $r_{o_{2C}}$ is found by the use of the expression for the instantaneous radius $r$ for any curve:

$$r = \frac{[1 + (g')^2]^{3/2}}{g''} \quad (4)$$

where $g'$ and $g''$ are the first and second derivatives respectively of the equation of the curve.

10. Using the determined value of $\theta$, establish the equation for the line representing the path of the $\gamma_C$ rays as they travel between point $(s_C, t_C)$ and $o_{1C}$ on mirror 1.

11. Transferring now to the $(u,v)$ coordinate system used with mirror 1, establish the coefficients of the equation for the mirror 1 curve along with the point of intersection of the curve with the ray from $(s_C, t_C)$ so that, at the intersection point $(u_C, v_C)$, the curve will have the required radius $r_{o_{1C}}$, will have the center $O_1$ of its coordinate system displaced from the center $O_2$ of the coordinate system of mirror 2 by the amount necessary to make the sum of the converging lengths $f_{1C}$ and $f_{2C}$ add up to the pre-established quantity $q$, will have the slope angle, as determined by the first derivative $g'$ of its equation, which results in the required angle $\psi$ between the arriving and departing rays.

Carrying out the foregoing steps by direct algebraic means provides exact values of the radii $r_{o_{1C}}$ and $r_{o_{2C}}$, of $f_{1C}$ and $f_{2C}$, of the coefficients of the mirror equations which give the required curvatures at points where their slopes are as demanded by the angular relationships to be met, and of the displacement of the centers $O_1$ and $O_2$. The coefficients of the equations of the mirrors also serve to specify the mirrors completely as to their scale and location relative to each other and to the pupil Y.

At this point in the procedure, we have, in effect, determined the positions, curvatures, and the angling of mirrors 1 and 2 at the points $o_{1C}$ and $o_{2C}$ which result in zero astigmatism and zero distortion for the projected central ray $\gamma_C$ from a selected point C in the object field.

We are now ready to apply the same fundamental algebraic procedures to the determination of the S and D characteristics associated with any other field angle $\gamma$ within the intended field of view.

For the tracing of the path of a projected central ray from an object point A at a field angle $\gamma_A$, the steps used are as follows:

1. Find the intersection $(s_A, t_A)$ of the $\gamma_A$ ray with the curve of mirror 2. The value of the first derivative of the equation of the mirror 2 curve at the point $(s_A, t_A)$ then determines the direction of the $\gamma_A$ ray path between the point $(s_A, t_A)$ and the point of its intersection with the mirror 1 curve at $(u_A, v_A)$.

2. Again utilizing the first derivative of the mirror curve, in this case that of mirror 1, find the slope of the mirror surface at $(u_A, v_A)$.

3. This slope angle, together with the angle of the ray between the two points of intersection is used to find the direction of the $\gamma_A$ ray as it travels between the object point A and the intersection $(u_A, v_A)$ on mirror 1.

4. The angle this ray from A makes with the u-coordinate axis of mirror 1 is the angle $\alpha_A$ which is used in the determination of the distortion D, of the binocular convergence characteristics, and of the predicted amount of head movement which is possible before unacceptable distortion occurs. We obtain these determinations by comparing the values of the angle $\alpha_A$ and the associated field angle $\gamma_A$ with the values of $\alpha_B$ and its associated field angle $\gamma_B$. Applied directly in the formula (3), these angles yield values of the distortion D for that portion of the image lying between any selected pair of rays $\gamma_A$ and $\gamma_B$.

5. For any pair of intersection points $(s_A, t_A)$ and $(u_A, v_A)$, we can find the converging lengths $f_{1A}$ and $f_{2A}$ associated with the angles $\theta_A$ and $\psi_A$ by finding the first and second derivatives of the equations of the curves for mirrors 1 and 2 and using the values in equations (4) and (2), where $\beta$ is equal to $\theta/2$ or $\psi/2$ as the case may be. From the values of $f_{1A}$ and $f_{2A}$ thus found and that of the distance $q$ between the points $(s_A, t_A)$ and $(u_a, v_a)$, we find the amount of astigmatism S associated with the image point A by using the formula (1).

The procedure as outlined above is used to find the S and D values associated with several values of the field angle $\gamma$. In determinations of the suitability of a certain type of mirror curve for the installation at hand, I trace three rays: $\gamma_A$ at the left side of the image field, $\gamma_C$ through the center of the image field, and $\gamma_B$ at the right side of the image field. The S and D data are obtained for several types of mirror curves which have been found by experience to produce good results. The information thus found is sufficient for the selection of a reasonably optimum pair of curve shapes for the mirrors 1 and 2. The suitability of the selected curves for any proposed mirror design is then checked out in greater detail by tracing rays at more closely spaced field angles $\gamma$.

That portion of my developed analytical procedure which determines optical performance at selected field angles through the study of the properties of ray paths is somewhat analogous to the ray tracing method widely used in the design of refractive lens systems. The ray tracing means which I originated and developed for the design of curved mirror systems adopts, for convenience, the scheme of tracing rays in the reverse direction: that is, starting at the center of the eye pupil, proceeding to the reflection at mirror 2, then to the reflection at mirror 1, and then to the object point. The object point is assumed to be at an infinite distance. Zero astigmatism is achieved when the rays from an object point enter the pupil in a parallel bundle.

The specific algebraic terminology and manipulations which I have employed in the examples to follow are not essential to the proper determination of the design characteristics and the S and D values. Other terminology and algebraic relationships may be employed as long as they are suitable and take into account the slopes and radii of the mirror surfaces through the use of the first and second derivatives of the equations of the mirror curves.

Example 1 gives in detail the algebraic means which I have used in the determinations of the S and D values associated with a particular proposed installation.

EXAMPLE 1

Design a two-mirror system for use in viewing rearwardly and to the left from the cab of a wide-bodied truck. FIG. 5a shows, schematically and in sectional plan view, the locations of mirrors 1c and 2c relative to the observer's head 24, the left side of the cab 25, the windshield 26, and the side of the truck body 27. The initial design criteria are as follows:

Field size: Minimum of 30° horizontally, the right edge of the field to correspond roughly with the left side of the truck body. Minimum of 6° vertically.

Astigmatism: S-value not over 0.50 diopters at any point in the image field.

Distortion: D-value not over 7½% for any 15° wide portion of the image field.

$i$ (the distance from pupil Y to intersection point $o_{2C}$): 363 mm. (14 inches)

$q$ (the distance from $o_{2C}$ to $o_{1C}$ along $\gamma_C$ ray): 705 mm. (27¾ inches).

The following attributes were adopted for the calculations of this example:

a. The s-axis and the u-axis of the coordinate systems used with mirror 2c and mirror 1c respectively are parallel to the longitudinal axis of the vehicle.

b. The $\gamma_C$ ray is central in the image field and −15° removed from the s-axis.

c. The cylinder curves of both mirror 1c and mirror 2c are elliptical. The equation for the mirror 2c curve is in the form:

$$\frac{s^2}{a_2^2} + \frac{t^2}{b_2^2} = 1$$

and for mirror 1c the curve is in the form $$\frac{u^2}{a_1^2} + \frac{v^2}{b_1^2} = 1$$

The eccentricity $\epsilon_2$ of the mirror 2c ellipse is defined as $$\epsilon_2 = \frac{a_2}{b_2}$$

and similarly, for mirror 1c:

$$\epsilon_1 = \frac{a_1}{b_1}$$

d. Eccentricities $\epsilon_2$ and $\epsilon_1$ were both set equal to 2.00.

Calculations for the $\gamma_C$ ray at −15° were carried out with the pupil Y located at the center of the intended viewing position. Table I shows the significant quantities involved in the determinations, their physical meaning, and actual values obtained for them under the conditions of this example.

As intended, zero values for both S and D have resulted from the use of the various coefficients as established by the initial calculations for the $\gamma_C$ ray path.

Using the data as developed above from the $\gamma_C$ calculations, we proceed to calculate the astigmatism S and the distortion D associated with the right and left edges of the field at $\gamma=0°$ and $\gamma=-30°$ respectively. Table II shows the S and D values thus obtained.

The S and D values of Table II are quite small, indicating the likelihood of excellent performance throughout the intended field. Had they been less acceptable, calculations similar to those used in compiling Tables I and II would be performed, using another value of the eccentricity $\epsilon$ for at least one of the mirror curves, or using a curve other than an ellipse, until satisfactory results were obtained.

The results of Table II apply to a pupil Y centrally located in the intended viewing position. S and D values are next calculated for shifts in the pupil to the right and to the left so as to obtain values from which binocular performance may be determined.

Table I

| Symbol | Meaning | Value |
| --- | --- | --- |
| $\gamma$ | Image field angle | −15.00° |
| x | s-coordinate of pupil Y | 2302.99 |
| y | t-coordinate of pupil Y | 603.00 |
| s | s-coordinate of intersection point (s,t) of $\gamma$ ray with mirror 2 | 2653.62 |
| t | t-coordinate with mirror 2 | 509.05 |
| $\delta$ | Slope angle of mirror 2 curve at (s,t) | 52.500° |
| d | Displacement between s- and u-axes | 313.10 |
| c | Displacement between t- and v-axes | 0.00 |
| v | v-coordinate of intersection point (u,v) of $\gamma$ ray with mirror 1 | 509.05 |
| $\omega$ | Slope angle of mirror 1 at (u,v) | 52.500° |
| $\alpha$ | Object field angle | −15.00° |
| $a_2$ | Coefficient "a" of mirror 2 equation | 2842.22 |
| $b_2$ | Coefficient "b" of mirror 2 equation | 1421.11 |
| $a_1$ | Coefficient "a" of mirror 1 equation | 2842.22 |
| $b_1$ | Coefficient "b" of mirror 1 equation | 1421.11 |
| $f_2$ | Mirror 2 converging length for $\gamma$ ray | 352.50 |
| $f_1$ | Mirror 1 converging length for $\gamma$ ray | 352.50 |
| $q-f_1$ | Quantity used in finding S (see formula 1) | 352.50 |
| S | Astigmastism | 0.00 |
| D | Distortion | 0.00 |

Table II

| Field Angle $\gamma$ (°) | S (diopters) | D(%) |
| --- | --- | --- |
| 0 | −0.25 | +2.8 |
| −15 ($\gamma_C$) | 0.00 | 0.0 |
| −30 | −0.03 | −1.5 |

Thus, changing the Table I value of y from 603.00 to a new value 635.50 represents a shift of the pupil 32.5 mm. to the right; a change in y to 570.5 represents a shift 32.5 mm. to the left. We thus simulate pupils separated by 65 mm., the average interpupillary distance. Table II shows the result of this study for binocular performance evaluation.

At both the left and right pupil positions, the S values of astigmatism are small, indicating a sharp image throughout the field. The D values for distortion are also acceptable, even at the extreme right edge of the field for the left eye, where $D = +5.7\%$.

The binocular convergence properties are determined by noting the difference between the object field angles $\alpha_R$ for the right pupil and $\alpha_L$ for the left pupil as calculated for the various field angles $\gamma$. Table IV shows the values of $\alpha_R - \alpha_L$ obtained, using the same values employed in finding the results given in Table III.

Plus (+) values of the quantity $\alpha_R - \alpha_L$ indicate that the image field rays from an object point A are diverging as they reach the pupils. Most people have considerable tolerance, far larger than the +0.78° maximum value of the table, before the effort of fusing diverging rays causes discomfort. The tolerance for converging rays is less, but well exceeds the minus (−) values of the table.

To determine the change in optical performance which results from a shift of the head away from the center of the intended viewing position as defined by the x- and y-values used in determining the results as given in Tables I and II, new calculations are performed using altered values of x and/or y.

Table III

| Field Angle | Right Eye (y = 635.5) | | Left Eye (y = 570.5) | |
|---|---|---|---|---|
| γ (°) | S | D | S | D |
| 0 | −0.26 | −0.1 | −0.21 | +5.7 |
| −2½ | −0.20 | −1.0 | −0.17 | +4.7 |
| −5 | −0.15 | −1.7 | −0.12 | +3.8 |
| −7½ | −0.09 | −2.1 | −0.08 | +3.2 |
| −10 | −0.05 | −2.3 | −0.04 | +2.7 |
| −12½ | 0.00 | −2.1 | 0.00 | +2.3 |
| −15 | +0.03 | −1.8 | +0.04 | +1.9 |
| −17½ | +0.06 | −1.4 | +0.07 | +1.8 |
| −20 | +0.06 | −0.8 | +0.09 | +1.6 |
| −22½ | +0.05 | −0.2 | +0.12 | +1.3 |
| −25 | 0.00 | +0.3 | +0.15 | +0.9 |
| −27½ | −0.07 | +0.3 | +0.19 | +0.4 |
| −30 | −0.17 | −0.2 | +0.25 | −0.4 |

Table IV

| Image Field Angle | Object Field Angle | | Convergence |
|---|---|---|---|
| γ (°) | $\alpha_R$ (°) | $\alpha_L$ (°) | $\alpha_R - \alpha_L$ (°) |
| 0 | 0.00 | −0.78 | +.78 |
| −2½ | −2.39 | −3.04 | +.65 |
| −5 | −4.85 | −5.35 | +.50 |
| −7½ | −7.36 | −7.71 | +.35 |
| −10 | −9.90 | −10.11 | +.21 |
| −12½ | −12.46 | −12.53 | +.07 |
| −15 | −15.02 | −14.98 | −.04 |
| −17½ | −17.56 | −17.44 | −.12 |
| −20 | −20.06 | −19.90 | −.16 |
| −22½ | −22.53 | −22.38 | −.15 |
| −25 | −24.99 | +24.88 | −.11 |
| −27½ | −27.48 | +27.43 | −.05 |
| −30 | −30.05 | −30.04 | −.01 |

Table V shows the S and D values which result from shifts in the pupil position to the positions defined by the coordinate pairs (x,y). (The center of the intended viewing position is at x = 2302.99, y = 603.00).

Table V

| | | Right Edge of Field (γ = 0°) | | Left Edge of Field (γ = −30°) | |
|---|---|---|---|---|---|
| x | y | S | D | S | D |
| 2302.99 | 603.00 | −0.25 | +2.8 | −0.03 | −1.5 |
| 2302.99 | 635.50 | −0.26 | −0.1 | −0.17 | −0.2 |
| 2302.99 | 570.50 | −0.21 | +5.7 | +0.25 | −0.4 |
| 2302.99 | 686.30 | −0.22 | −6.3 | +0.06 | −3.8 |
| 2302.99 | 545.10 | −0.16 | +8.2 | +0.54 | +3.4 |
| 2366.49 | 603.00 | −0.28 | +2.8 | −0.18 | −0.1 |
| 2214.09 | 603.00 | −0.25 | +2.8 | +0.46 | −2.5 |
| 2214.09 | 686.30 | −0.22 | −4.9 | −0.17 | −0.5 |
| 2214.09 | 545.10 | −0.16 | +9.9 | +1.14 | +31.8 |
| 2366.49 | 545.10 | −0.16 | +7.5 | +0.14 | −1.4 |
| 2366.49 | 686.30 | −0.16 | −10.1 | +0.63 | +2.1 |

Graphical analysis of Table V values indicates that a sharp, reasonably undistorted image should be obtained over a range of x-values from about 2200 to 2350, representing a 150 mm. (6 inch) front to back shift in pupil position, and over a range of y-values from about 560 to 675, representing a 115 mm. (4½ inch) right to left shift in pupil position. The mirror system of the example is thus shown to be insensitive to moderate shifts of the head.

Keeping the mirrors no greater in length than they need to be for binocular viewing of the image field from the center of the intended viewing position avoids the extremes of distortion such as occurs at the left edge of the field with the pupil at the (x = 2214.09, y = 545.10) position because the lengths of the mirrors are not then enough to provide the areas which would reflect such distorted portions of the field. This technique for the control of aberration is analogous to the use, in the design of lens systems, of "vignetting" through the restricting of lens diameters.

The optimum lengths for the mirrors may be determined graphically or from the (s,t) and (u,v) coordinates of the intersection points of the furthest separated rays which are to be used. The lengths which I have determined as being appropriate for this example are 290 mm. (11½ inches) for mirror 1c and 360 mm. (14 inches) for mirror 2c.

The mirror widths required are proportional to the angular extent of the field in the vertical direction, in this case 6°, and must be larger as their distance from the pupil increases. For the installation of this example, suitable widths for the mirrors are 125 mm. (5 inches) for mirror 1c and 50 mm. (2 inches) for mirror 2c.

Summarizing the results given in this example, a mirror system design has been determined which meets the design criteria, which provides for comfortable binocular vision, and which is insensitive to moderate shifts in pupil position. The data needed for the manufacture of the mirrors are directly determined from the following specifications and from the (s,t) and (u,v) coordinates of the ends of the mirrors:

| Type of cylinder curve | For mirror 1c | For mirror 2c |
|---|---|---|
| | Elliptical | Elliptical |
| Eccentricity ε | 2.00 | 2.00 |
| Coefficient "a" | 2842.22 | 2842.22 |
| Length | 290 mm. (11½") | 360 mm. (14") |
| Width | 125 mm. (5") | 50 mm. (2") |

The dimensional information required for the mounting of the mirrors is best determined graphically, using the linear and angular values obtained by reference to the coordinate systems used in the calculations.

Note that the mirror 1c, which is the outer mirror, is shorter than mirror 2c. This is a valuable attribute and is found to be the case with most 2-mirror systems designed in accordance with my invention. Also, it is not necessary for mirror 1c to extend more than a small amount beyond the side of the vehicle. This feature will be understood by referring to FIG. 5a, from which it is seen that the rays effective in imaging the left outer portion of the field are reflected by the inner portion of mirror 1c. The reverse is true of single, flat mirrors, with which the outer edge must extend well beyond the side of the vehicle in order that the object field adjacent to the side of the vehicle may be seen as reflected from the inner edge of the mirror.

The mirrors of Example 1 are intended to be installed so that the image field as reflected by mirror 2c is seen in an upward location towards the top of the vehicle windshield, as shown schematically and in elevation in FIG. 5b. Alternatively, and by adopting suitably changed values of the separations i and q, a system design can be determined in the same manner as described in the foregoing which is suited to the type of installation shown in FIG. 5c, where mirror 2d is located just above the dash in cab 30.

My experience, arrived at from calculating the performance characteristics achievable with the use of various types of mirror curves and with the various mirror separations and orientations required with a variety of vehicle installations, is that a design which provides a value of S of less than 0.25 diopters at either extreme edge of the field, accompanied by a distortion value D less than 5.0% will, when the $\gamma_C$ ray used in the determination of system parameters is that for the center of the field, result in satisfactorily small amounts of astigmatism distortion throughout the field, along with satisfactory binocular convergence properties and a reasonable latitude for head movement without impairing optical performance. System performance, can, therefore, be judged quite well based only upon the tracing of rays for the center and edges of the intended field. The calculations for the ultimate design for a particular installation will, of course, be carried out in greater detail so as to verify fully the performance to be expected and to insure that the best available parameters have been selected.

EXAMPLE 1a

Using the same design criteria as are employed in Example 1 above, I determined the S and D values which result from the use of elliptical cylinder curves of various other eccentricities $\epsilon$. Table VI gives the S and D values which were thus obtained.

TABLE VI

Mirror 1c and mirror 2c curves are both elliptical in cross-section.

| Eccentricities | | Rt. edge of field | | Left edge of field | |
|---|---|---|---|---|---|
| $\epsilon_1$ | $\epsilon_2$ | S | D | S | D |
| 2.00* | 2.00* | −0.25 | +2.8 | −0.03 | −1.5 |
| 1.30 | 2.00 | −0.33 | −5.2 | −0.25 | −0.2 |
| 1.00** | 2.00 | +0.20 | −11.8 | −0.47 | +0.9 |
| 1.30 | 1.70 | +0.08 | −4.2 | −0.53 | −3.8 |

*These values used in Example 1.
**An $\epsilon$ value of 1.00 represents a circular curve.

The best overall performance is seen to result from the use of eccentricities $\epsilon_1 = 2.00$ and $\epsilon_2 = 2.00$. These values were accordingly used for the more detailed investigations reported under Example 1.

(Some small economies in the manufacture of the mirrors should result from the use of cylindrical mirrors which are circular in cross-section ($\epsilon=1.00$). However, a loss in optical performance accompanies their use).

EXAMPLE 1b

Again using the design criteria of Example 1, S and D values were determined for cylindrical mirrors whose cross-sections are fourth-order curves, of the form $$s = a - bt^2 - ct^3 - dt^4$$

and $$u = g - lv^2 - mv^3 - nv^4$$

Two of the coefficients $b$, $c$, $d$ are independent of each other, as are two of $l$, $m$, $n$. Table VII shows the S and D values which result from the use of fourth-order curves with various combinations of coefficients for both mirrors.

Table VII

| Coefficients | | | | | | Rt. Edge of Field ($\gamma = 0°$) | | Left Edge of Field ($\gamma = -30°$) | |
|---|---|---|---|---|---|---|---|---|---|
| b | c×10⁻⁶ | d×10⁻⁸ | l | m×10⁻⁶ | n×10⁻⁸ | S | D | S | D |
| .0019 | −2.979 | .2645 | .0019 | −2.979 | .2645 | +1.07 | −6.3 | −4.80 | −13.5 |
| .0019 | −2.836 | .2554 | .0019 | −2.979 | .2645 | +0.86 | −6.6 | −1.29 | −8.9 |
| .0019 | −2.836 | .2554 | .0022 | −3.903 | .3621 | +1.01 | −15.0 | −2.70 | −4.3 |
| .0017 | −2.168 | .1888 | .0017 | −2.168 | .1888 | +0.58 | −5.4 | −0.15 | −4.1 |
| .0017 | −2.168 | .1888 | .00165 | −1.993 | .1715 | +0.55 | −3.5 | +0.02 | −4.6 |

The best set of S and D values is seen to result from the use of the coefficients listed in the last row of the table. The use of the fourth-order curves described by this set of coefficients was given the same detailed investigation as employed with the ellliptical curves of Example I.

With the fourth-order curves, the amount of distortion was higher, particularly near the center of the field. Binocular convergence errors were appreciably larger than with the use of elliptical curves.

As there were no specific advantages in the use of fourth-order curves for this installation, the elliptical curves of Example 1 are to be preferred.

EXAMPLE 2

The performance characteristics S and D were determined for the basic mirror installation described in Example 1 and shown in FIG. 5a, but with the distance $q$ altered from 705 mm. to 515 mm. (20¼ inches) along the $\gamma_C$ path. The use of this reduced value of $q$ avoids an unnecessary extension of the outer mirror beyond the side of the vehicle when the operator's position is further to the left side than it is with the system of Example 1. Table VIII shows the S and D values which result when this altered specification is used.

TABLE VIII

Design criteria as in Example 1, except $q = 515$. Both mirrors elliptical in cross-section.

| Eccentricites | | Right Edge of Field ($\gamma = 0°$) | | Left Edge of Field ($\gamma = -30°$) | |
|---|---|---|---|---|---|
| $\epsilon_1$ | $\epsilon_2$ | S | D | S | D |
| 2.00 | 2.00 | −0.35 | −0.2 | +0.46 | −0.6 |
| 1.85 | 1.85 | −0.26 | −0.2 | +0.27 | −3.1 |
| 1.70 | 1.70 | −0.15 | −0.2 | +0.01 | −7.2 |

From the above results, we see that the eccentricities of $\epsilon = 1.85$ for both mirrors provide satisfactory optical performance. The eccentricities $\epsilon = 2.00$, found most desirable with the conditions of Example 1, are somewhat less suited to the changed requirements of Example 2. It should be noted that the use of mirrors of eccentricity $\epsilon = 2.00$ for the Example 2 requirements is accompanied by different values of the coefficients $a$ and $b$ of the ellipse equations from those used in Example 1.

No significant benefits to the system of this example, or to that of Example 1, were found with the use of $\epsilon$-values which were different for the two mirrors.

EXAMPLE 3

Figure 5D:
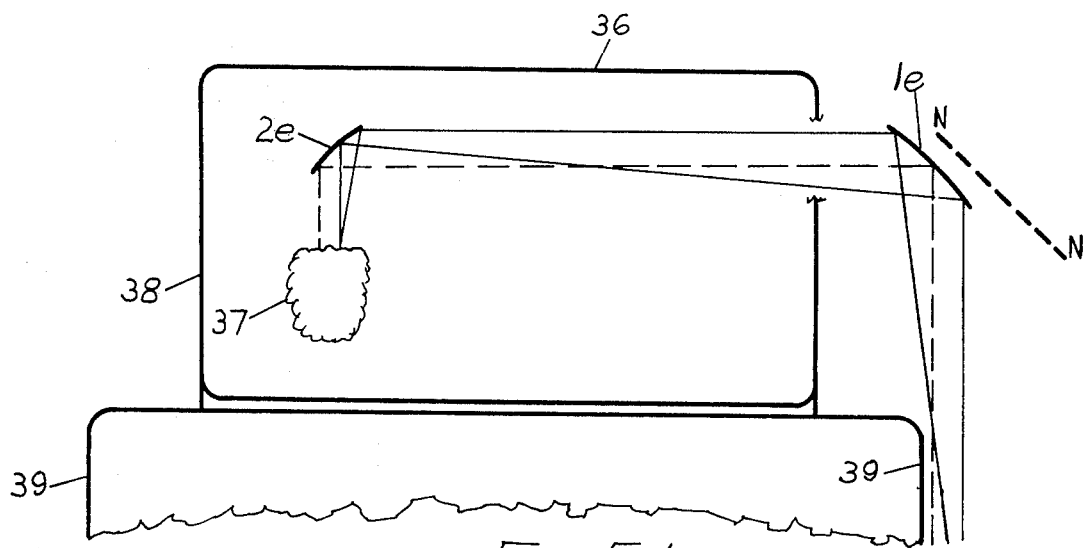
FIG. 5d shows the configuration of a mirror arrangement which images a view on the right side and to the rear of a wide-bodied vehicle.

FIG. 5d shows a system which permits the observer 37 in cab 38 to see an object field to the right rear while gazing straight ahead into mirror 2e. Mirror 1e protrudes barely beyond the edge of the wide-bodied truck 39 or other vehicle. This system is similar to that described in Example 1 but with the mirror orientations reversed right for left and with mirrors 1e and 2e separated by a greater distance. The calculations required for such a system design are performed in the same manner as those of Example 1. Table IX shows the S and D values which result from the use of a larger mirror separation $q$ of 1460 mm. (57½ inches) along the path of the $\gamma_C$ ray and with elliptically cross-sectioned mirrors of eccentricities $\epsilon_1 = \epsilon_2 = 1.70$. The other design criteria remain as those of Example 1.

TABLE IX

Design criteria same as in Example 1, except $q = 1460$ mm. S and D values are for pupil at center of intended viewing position.

| Image Field Angle γ (°) | S Diopters | D % |
|---|---|---|
| 0 | 0.02 | 2.4 |
| −7½ | 0.00 | .5 |
| −15 | 0.00 | 0.0 |
| −30 | −0.22 | 2.7 |

From the S and D values found, we can confidently predict excellent design performance over the entire 30° width of field.

With the greater separation $q$ needed with this example the full 30° view to the right requires that the mirror 2e be 360 mm. (14 inches) long, as with Example 1, and that the mirror 1e be 930 mm. (37 inches) long. A reduction in the angular extent of field from 30° to 7½° would result in shortening the necessary length of mirror 2e to 175 mm. (6½ inches) and that of mirror 1e to 305 mm. (12 inches). The mirrors 2e and 1e of FIG. 5d are roughly to scale and of lengths suitable for a 7½° field.

The dotted line N—N of FIG. 5d indicates the relative size and position of a single 18 inch wide flat mirror which would reflect the same 7½° field of view.

EXAMPLE 3a

Figure 6:
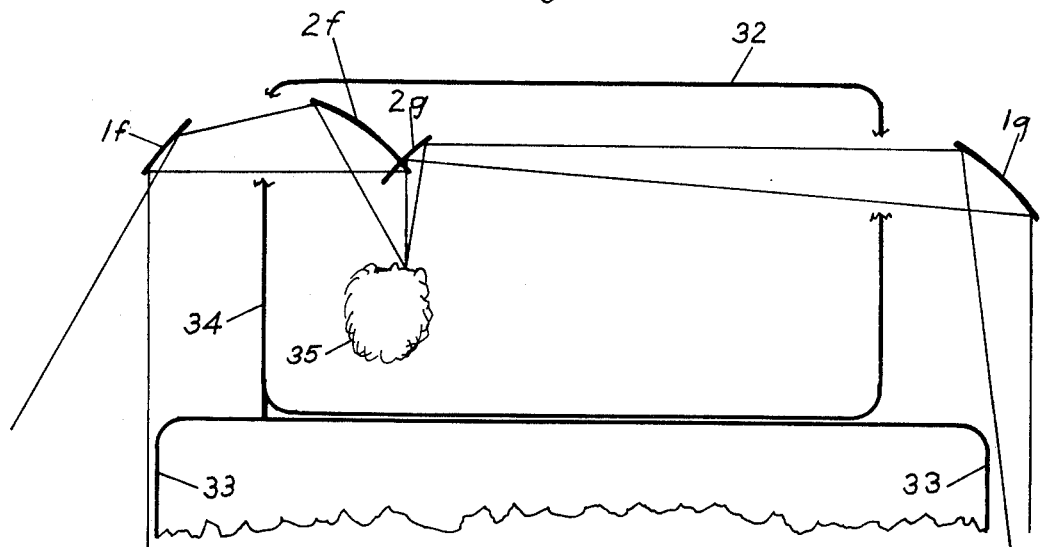
FIG. 6 shows, schematically and in plan view, how two of my mirror systems can be combined to provide for the simultaneous viewing of rearward object fields to the right and to the left.

The mirror system as described under Example 2 can be combined advantageously with that shown in FIG. 5d and described under Example 3. FIG. 6 shows, to scale in plan view, such a combined arrangement and its positioning relative to the vehicle (32, 33, 34) and to the observer 35. While maintaining a straight-ahead direction of gaze, the observer is enabled to see adequate views to the left rear and to the right rear. Mirrors 1f, 2f, 1g and 2g are all differently curved.

EXAMPLE 4

For a 30° horizontal angular extent of object field having the left side of the vehicle as its right edge, the ray $\alpha_C$ from a central object point C to the outer mirror is separated 15° from the longitudinal axis of the vehicle. The mirror systems discussed in the previous examples and shown in FIGS. 5a–d are angularly symmetrical about this vehicle axis. That is, the image field ray $\gamma_C$ makes the same angle of −15° with the longitudinal axis as does the associated object field ray $\alpha_C$. Because the object field is to the left of the vehicle, the image field is to the left of the pupil with this mirror orientation.

By having the object and image field angles relate to an axis other than the longitudinal axis of the vehicle, we can displace the image field to the right or left at will. In FIG. 16, the reference axis s—s for the field angles has been rotated 7½° clockwise in the plan view from the longitudinal axis. The result is that the center of the image field is now in the straight-ahead position, for which $\gamma_C$ is −7½°, instead of being 15° to the left. The central object field ray $\alpha_C$ associated with $\gamma_C$ also makes an angle of 7½° with the new, rotated axis.

Table X presents some of the S and D performance values with a mirror system having the basic geometry shown in FIG. 16 in cross-section, and using a variety of cross-sectional curves for the cylindrical mirrors.

We see from Table X that, at the central location Y within the intended viewing position, several combinations of types of cross-sectional curves of mirrors 1h and 2h give acceptable values for S and D.

A comparative study was made to find the range of pupil positions over which acceptable performance was maintained, using (1) mirror 1h curve elliptical with $\epsilon_1 = 1.30$ and mirror 2h curve elliptical with $\epsilon_2 = 1.70$, and (2) both mirrors with fourth order curves having the coefficients which resulted in the excellent S and D values given in the last line of Table X. The image quality for both of these combinations was found to drop off faster with increased distance from the central pupil position than was the case with the Example 1 arrangement. To obtain the top optical performance of which the Example 4 system is capable, the observer's head would require to be located within a more limited viewing position.

EXAMPLE 5

By positioning the mirror 1j of FIG. 7a at the left and forward of the vehicle windshield and reflecting the light rays through the windshield 40 to mirror 2j in front of the observer 41, we achieve the desirable and widely useful arrangement shown schematically and in sectional plan view in FIG. 7a.

Table X

| Type of curve* | | Right edge of field (γ=+7½°) | | Left edge of field (γ= −22½°) | |
|---|---|---|---|---|---|
| $\epsilon_1$ | $\epsilon_2$ | S | D | S | D |
| 1.30 | 1.60 | +0.02 | −0.9 | +0.06 | −3.8 |
| 1.50 | 1.60 | −0.10 | +1.9 | +0.14 | −4.3 |
| 1.70 | 1.60 | −0.22 | +4.1 | +0.21 | −4.7 |
| 1.30 | 1.80 | −0.03 | −2.1 | +0.30 | 0.0 |
| 1.50 | 1.80 | −0.16 | +0.8 | +0.37 | −0.4 |
| 1.70 | 1.80 | −0.28 | −3.1 | +0.42 | −0.7 |
| 1.30 | 1.70 | −0.01 | +1.5 | +0.19 | −1.8 |
| Both circular | | +0.58 | +1.6 | −1.67 | −17.0 |
| 1h: Circular 2h: Parabolic | | −0.05 | −12.9 | +1.48 | +27.8 |

Table X-continued

| Type of curve* | | Right edge of field ($\gamma=+7\frac{1}{2}°$) | | Left edge of field ($\gamma=-22\frac{1}{2}°$) | |
|---|---|---|---|---|---|
| $\epsilon_1$ | $\epsilon_2$ | S | D | S | D |
| 1h: $u = g + lv^2 + mv^4$<br>( <br>2h: $s = a + bt^2 + ct^4$ | | −0.52 | +3.9 | +0.36 | −2.3 |
| 1h: Circular<br>(<br>2h: $s = a + bt^2 + ct^4$ | | −0.14 | −8.3 | +0.10 | +0.4 |
| 1h: $\epsilon = 1.30$<br>(<br>2h: $s = a + bt^2 + ct^4$ | | −0.07 | −2.6 | +0.25 | −0.4 |
| 1h: $u = g \sin\left(hv + \frac{\pi}{2}\right)$<br><br>2h: $s = a \sin\left(bt + \frac{\pi}{2}\right)$ | | +0.48 | +17.6 | +0.51 | +26.5 |
| 1h: Parabolic<br>(<br>2h: Parabolic, different coefficients | | −1.60 | +11.9 | +1.53 | +26.0 |
| 1h: $u = g + lv^2 + mv^3 + nv^4$<br>(<br>2h: $s = a + bt^2 + ct^3 + dt^4$ | | −0.14 | −1.2 | +0.02 | +1.6 |

*Where $\epsilon_1$ and $\epsilon_2$ values are given, the associated mirror is elliptical in cross-section.

Note that mirror 1j needs to extend only a fraction of an inch outwards from the side of the vehicle body 42 in order to see the entire 30° object field was indicated.

As with previous examples, the following design criteria are to be met by the optical system of this example:
  Maximum S-value: 0.50 diopters
  Maximum D-value: 7½%
  Horizontal extent of image field: 30°
  Vertical extent of image field: 6°
  Convergence error satisfactory for binocular use.
  Adequate latitude in positioning head before S and D tolerances are exceeded, For an installation in a typical passenger sedan 28, the distance $i$ for the central $\gamma_C$ ray will be about 290 mm., and the distance $q$ will be about 440 mm. for the same ray.

The following attributes were selected for the design calculations of this example:
  a. The s- and u-axes of the coordinate system adopted are rotated 15° clockwise from the longitudinal axis of the vehicle.
  b. The $\gamma_C$ ray is central in the image field and +7½° removed from the s-axis.
  c. The cylinder curves of both mirrors are elliptical and have the sme eccentricity $\epsilon = 1.35$.

Table XI shows the results obtained for the system of this example by performing the computations in the manner described under Example 1. The right and left pupils were positioned centrally within the intended viewing position for the calculations.

The S and D values found are seen to be well within the imposed tolerances for astigmatism and distortion. Throughout the field, the convergence error is small and should represent no discomfort in viewing.

Additional calculations were performed for the purpose of determining the size of the intended viewing position, wherein the pupil can be located and received an image in which the S and D values are within tolerance. For this particular design the permissible pupil position range was 3 inches from right to left and over 5 inches from front to rear. There is thus an acceptable latitude in observing positions with the system as designed.

Table XI

| Image Field | Right Eye | | | Left Eye | | | Convergence Error |
|---|---|---|---|---|---|---|---|
| Angle $\gamma(°)$ | S | D | $\alpha_R$ | S | D | $\alpha_L$ | $\alpha_R - \alpha_L$ |
| −7½ | −.12 | +1.3 | −7.303 | +.28 | −0.7 | −7.599 | +.30 |
| −2½ | +.15 | 0.0 | −2.501 | +.13 | −0.1 | −2.508 | +.01 |
| +2½ | +.27 | −4.1 | +2.284 | +.06 | +0.3 | +2.517 | −.23 |
| +7½ | +.29 | +0.1 | +7.206 | +.02 | +0.6 | +7.507 | −.30 |
| +12½ | +.23 | +4.4 | +12.290 | −.02 | +0.2 | +12.489 | −.20 |
| +17½ | +.14 | +0.1 | +17.490 | −.07 | +0.3 | +17.472 | +.02 |
| +22½ | +.03 | −1.5 | +22.721 | −.13 | +0.4 | +22.441 | +.28 |

The essential sepcifications for the shapes and locations of the mirrors of this system were determined to be as follows:

| | Mirror 1j | Mirror 2j |
|---|---|---|
| Type of curve | Elliptical | Elliptical |
| Eccentricity $\epsilon$ | 1.35 | 1.35 |
| Coefficient "a" | 685.71 | 685.71 |
| Size in inches | 4 × 7½ | 2 × 11 |

Separation between mirrors along ray $\gamma_C = +7\frac{1}{2}°$; 400 mm. (17¼ inches)

Separation, pupil to mirror 2j along $\gamma_C$ ray, pupil at center of intended viewing position: 290 mm. (11½ inches).

Knowledge of the exact portions of the elliptical arcs of the mirrors, required for their manufacture and mounting, is obtainable directly from the detailed calculations.

FIG. 7b shows the installation of this example in a sectional right side elevation view.

FIG. 7c shows schematically another system installation for a sedan body 43 in which the light path between mirrors 1k and 2k traverses the windshield 44 en route to the observer 45. This system is similar to that shown in FIG. 7a, but its orientation has been changed by having been rotated counterclockwise about a vertical axis. This shift causes mirror 1k to extend further out from the vehicle body but permits viewing several degrees to the right of straight back. A mirror 1k whose outer edge extends 6 inches beyond the side of a normal sedan body will in this manner provide for observing objects about 6° to 9° to the right rear of the left side of the sedan.

FIG. 7d shows, schematically and in plan view, a mirror system configuration which has the basic arrangement of FIG. 7a, but is adapted for use with a wide-bodied vehicle 49. The light from the object field reaches the observer 48 in the cab 47 after having gone through the windshield 46 in its path between the mirrors 1m and 2m.

EXAMPLE 6

For the determination of the various coefficients and parameters involved in a satisfactory optical design for a particular mirror arrangement, the use of the orderly analytical procedure, which was explained in the foregoing and demonstrated in detail under Example 1, will usually save considerable time but is not essential. I used trial and error methods with success in determining the curves, separations, and angling of the mirrors required for an application having the mirror arrangement shown schematically and in plan view in FIG. 8, where an object field having the unusually wide horizontal extent of 60° was desired.

The design criteria for the optical system of this example are as follows:

Field size: Minimum of 60° horizontally, 6° vertically.
Orientation of object and image fields: The right edge of the image field to lie at $\gamma = 0°$ (straight ahead), the left edge of the image field to lie 60° to the left ($\gamma = +60°$), and the right edge of the object field to be directly back ($\alpha = 0°$), and the left edge of the object field to lie at $\alpha = +60°$ (120° to the left and rear of the straight ahead direction).
Astigmatism: S-value less than 0.5 diopters at any point in the image field when the pupils are within the intended viewing position.
Distortion: D-value less than 7½% for any 10° wide portion of the image field when pupils are within the intended viewing position.
Convergence properties: Suitable for comfortable binocular viewing when pupils are within the intended viewing position.
Size of intended viewing position: adequate to provide leeway for inadvertent shifts in head position 50.
$i$ (the distance from the pupil Y, centered in the intended viewing position, along the projected central ray for $\gamma = 30°$ to the point of intersection with mirror 2h): 315 mm.(12½ inches)
$q$ (the distance between the points of incidence on the mirrors along the projected central ray path through the center of the intended viewing position for $\gamma = 30°$): 810 mm.(32 inches)
Direction of central ray ($\gamma_C = 30°$) between the mirrors: Approximately at 90° to the straight-ahead direction.

The following attributes were adopted for the calculations of this example. They were determined largely through trial and error and led to satisfactory results:

a. The s- and u-axes of the coordinate systems were established as being parallel to the straight-ahead direction of gaze.
b. The right edge of the object field will then be seen at $\gamma = 0°$ and the left edge seen at least 60° removed. ($\gamma = +60°$ or beyond).
c. The cylinder curves of both mirrors are elliptical in sections perpendicular to their cylinder axes.
d. Eccentricities $\epsilon_1$ and $\epsilon_2$ each having the value 1.2649 were used.

Outstanding results, as shown in Table XII, were obtained with the use of the system data as detailed above. Before these successful results were obtained, calculations for the S- and D-values associated with the use of numerous forms of mirror curves and mirror orientations were made.

TABLE XII

Performance data for the system configuration shown in FIG. 8, both mirrors elliptical in cross section, with $\epsilon_1$ and $\epsilon_2 = 1.2649$ and $a_1 = a_2 = 910.72$. Pupils centered within the intended viewing position and separated by 65 mm.

| Field Angle $\gamma(°)$ | Astigmatism (S) diopters Rt. Left Eye | | Distortion (D) % Rt. Left Eye | | Convergence $\alpha_R - \alpha_L$ |
|---|---|---|---|---|---|
| 0 | .04 | −.16 | −4.5 | 0.0 | −.37 |
| 5 | .03 | −.04 | −3.2 | 0.7 | −.13 |
| 10 | .04 | −.02 | −2.0 | 1.4 | +.03 |
| 20 | .04 | −.05 | 0.0 | 0.7 | +.10 |
| 30 | .01 | .00 | +0.7 | −0.7 | −.03 |
| 40 | −.02 | −.06 | +0.7 | 0.0 | −.10 |
| 50 | −.04 | −.09 | +3.1 | 2.4 | −.17 |
| 60 | −.02 | −.08 | +3.4 | 4.2 | −.10 |
| 70 | +.04 | −.02 | +3.8 | 4.5 | −.03 |

The values in the table indicate that the system design as developed provides for quite sharp and sensibly undistorted images over the entire field of 70° horizontally. The convergence quantities ($\alpha_R - \alpha_L$), while mostly minus (−), are small, and signify that comfortable binocular viewing should be expected with the system.

For the purpose of determining the effect on image quality of the use of different head positions, additional calculations were performed which simulated shifts in pupil position from right to left and forward and back from the center of the intended viewing position. In this manner, I found that the pupil position could be displaced about 180 mm. (7 inches) from right to left and about 190 mm. (7½ inches) from front to rear before the established specifications for astigmatism S and distortion D were exceeded.

This particular example of my system of two cylindrically concave mirrors strikingly exhibits the excellent optical performance which can be obtained with such systems over wide fields of view.

For its use in automotive vehicles, the horizontal field width would be reduced to perhaps 30° instead of the 60° or more available with the specified design. FIG. 9 shows, schematically and in plan view, how such a system giving a 30° horizontal field might be positioned within the passenger space 52. In elevation, the system would be located somewhat similarly to the system of Example 1 as shown in FIG. 5b. The reduction in field permits reducing the lengths of mirros 1p and 2p to a size readily housed within a passenger sedan.

Scientific-type computers may obviously be used with benefit in connection with the optical design work connected with my mirror systems. Their use enables the rapid and thorough trial of a large variety of mirror curves and positions, together with the quick determination of available latitude for shifts in pupil positions.

The S and D values associated with the use of the elliptical curves as given in Table X under Example 4 were determined through the use of a large computer which was programmed especially for the purpose. Similarly, the trial and error methods employed in this present Example 6 could be broadened and made to result in greater detail through the use of a programmed computer.

EXAMPLE 7

In the mirror arrangement of this example, the two mirrors have their cylinder axes horizontal and occupy positions relative to the vehicle body, which in this case is that of a passenger sedan, as shown schematically in the side elevation in FIG. 10a, and in front elevation in FIG. 10b. This arrangement works advantageously in conjunction with the body of the normal passenger sedan, because the view to the rear is not obstructed by the vehicle body 53.

The design criteria for a particular installation having the general arrangement shown in FIGS. 10a and 10b are as follows:

Maximum astigmatism: S-value less than 0.50 diopters.

Maximum distortion: D-value less than 7½%.
Horizontal extent of field: The extent depends only upon the length of the mirrors supplied. For this example, a horizontal field of 30° in extent is assumed.
Vertical extent of field: 6°.
Distance from pupil in center of intended viewing position to center of mirror 2q; 690 mm. 27 inches)
Distance between points of incidence on mirrors 1q and 2q for the central ray $\gamma_c$: 488 mm. (19 inches).

The design attributes selected for the system calculations are as follows:

The coordinate systems containing the mirror curves in cross section lie in a vertical plane which is parallel to the longitudinal axis of the vehicle.

The s- and u-axes of the coordinate system are tilted downwards 6° toward the front of the vehicle. The central ray $\gamma_c$ lies +7½° from the s-axis. The cross sectional curves of the mirror cylinders are both elliptical and have the same eccentricity: $\epsilon = 1.35$.

Again applying the same methods of analysis and design as were given in detail under Example 1, calculations of the S- and D-values associated with the above requirements were carried out, with the results as shown in Table XIII.

Table XIII

| Image Field Angle $\gamma$ | S. diopters | D% |
|---|---|---|
| +4½ | 0.06 | 0.8 |
| +7½ | 0.00 | 0.0 |
| +10½ | 0.03 | 0.1 |

Because the direction of the displacement between the pupils of the observer corresponds in this arrangement with the alignment of the cylinder axes, binocular convergence problems do not exist. Further, a shift in the position of the observer's head 55 to the left or right introduces no change in the optical quality of the view.

Additional calculations also showed that the observer's head 55 could be moved 2½ inches in the up and down direction and at least 8 inches back and forth with the optical performance remaining within the given tolerances.

The mirror specifications which I have developed for this example may be summarized as follows:

| Type of curve | Mirror 1q | Mirror 2q |
|---|---|---|
| Type of curve | Elliptical | Elliptical |
| Eccentricity | 1.35 | 1.35 |
| "a" coefficient: | 760.51 | 760.51 |
| Size: | 4" × 25" | 6½" × 14½" |

Distance between mirrors along $\gamma_c$ path: 488 mm.

Making the mirror 2q the full 6½ inches in width permits viewing the entire vertical expanse of the field when the observer's head is located anywhere within the 2½ inches vertical extent of the viewing position. Mirror 2q may be made as narrow as 3 inches and still accomodate a range of vertical positions of the observer's head by providing means whereby the mirror may be tilted around an axis parallel to its cylinder axis.

The optical performance resulting from tilting mirror 2q as described is readily calculated. For this purpose the coordinate system for the s- and t-axes of the mirror 2q was rotated about a selected point, the position of the point being such as to avoid any large amount of shift in the position of mirror 2q other than that of rotation. The results obtained from this rotation of the mirror 2q coordinate system simulated the results to be expected when the mirror was tilted by the observer to obtain the full vertical field of view. In the above manner, I determined that the mirror 2q could be tilted at least 4° in either direction without significantly impairing the optical qualities of the view.

Tilting the mirror 2q changes the direction of the reflected rays, so that they form a field of view which is higher or lower than that seen with the mirror 2q in its centered position. Thus, the observer is free to sit at any convenient height, and secures the full vertical field of view by tilting the mirror 2q in its mount, much as is done with the customary single rear vision mirror for the same purpose.

Utilizing this amount of tilt permits the observer's head to be positioned anywhere within a vertical range of about 4 inches while seeing the entire vertical extent of the field, and at the same time allows the width of mirror 2q to be reduced to 3 inches. A somewhat wider mirror, combined with the same amount of tilt, would permit of a still greater range of viewing positions.

Mirror systems in which the cylinder axes are nearly vertical, such as those described in Examples 1 through 6 and shown in FIGS. 5a, 5b, 5c, 5d, 16, 6, 7a, 7b, 7d, 8 and 9, may be benefitted functionally by providing means permitting the inner mirrors (2c through 2p) to be tilted about their cylinder axes. With these systems, tilting the inner mirror shifts the field of view to the right or left so that it may be adjusted to suit the lateral position of the observer. The optical performance to be expected when the inner mirror is in a tilted position is determined in the same manner suggested for the horizontal axis system of Example 7.

The mirror arrangement shown in FIGS. 10a and 10b may be altered as shown schematically and in plan view in FIG. 10c. Placing the mirror 1r somewhat to the rear as shown provides a more acceptable styling effect.

Another workable arrangement of the mirror system, again having the cylinder axes of the mirrors in the horizontal position, is shown schematically and in side elevation in FIG. 10d. This configuration has the mirror 2s positioned as shown just below the top and inwardly from the windshield 59. Because both mirrors are closer to the eyes of the observer, 60, they may be smaller in width and length and cover the same field size as the larger mirrors of Example 7. With this arrangement, symmetry in angular orientations is possible. The optical performance can be predicted, from past experience with the design of similar systems, to be quite good.

A study of FIGS. 10a, 10c, and 10d, along with the information on mirror sizes given in Example 7 reveals that the outer mirror of the illustrated systems, in its position above the windshield, is considerably narrower than might perhaps be expected. This reduced width of the outer mirror is a property which is typical of all of my two-mirror systems. It is particularly evident with the examples just cited. Compared with the outer mirror required with an equivalent flat mirror periscope system involving three flat mirrors, the outer mirror, as indicated in FIGS. 10a, 10c, and 10d is significantly narrower. This smaller width and less bulk in the exterior mirror permits a more attractive mounting to be designed. Reduced wind resistance and wind noise and further advantages of the smaller mirrors.

The successful mirror systems I have developed possess a remarkable geometrical property which results in their functioning satisfactorily over extended fields of view. This property is the close correspondence between the image field angle $\gamma$ and its associated object field angle $\alpha$ (see FIG. 3). This correspondence persists over a wide range of values of $\gamma$ and $\alpha$ and of the angles of incidence of the light rays on the reflective surfaces. Also, this correspondence exists even though, in the portions of the light paths between their points of incidence on the mirrors, the paths are not parallel or controlled with respect to their inclinations to each other.

The above geometrical property is well illustrated by a study of Table XIV, which shows the results of some of the calculations made in the course of the design work for Example 6. In the table, and referring to FIG. 3, the angle $\gamma$ is the image field angle measured from the s coordinate axis, $\alpha$ is the object field angle measured from the s-axis, $\phi$ is the angle of the central ray path between mirrors, also measured from the s-axis, and $\delta$ is the departure from exact correspondence between angles $\gamma$ and $\alpha$.

Table XIV

| $\gamma$ | $\alpha$ | $\delta_\alpha$ | $\phi$ |
| --- | --- | --- | --- |
| 0° | 0° 4' | 0° 4' | 88° 26' |
| 10° | 10° 0' | 0° 0 | 84° 38' |
| 20° | 19° 56' | −0° 4' | 84° 22' |
| 30° | 30° 0' | 0° 0' | 86° 30' |
| 40° | 40° 0' | 0° 0' | 90° 12' |
| 50° | 49° 46' | −0° 14' | 94° 50' |
| 60° | 59° 22' | −0° 38' | 100° 8' |

The departure value $\delta$ is seen to be notably small for values of $\gamma$ ranging from 0° to over 40°.

The successful design of mirror systems in accordance with the principles I have conceived and developed involves the determination of mirror configurations which will take advantage of the available property of angular correspondence, as discussed above, while simultaneously avoiding unacceptable amounts of astigmatism. The several examples given amply illustrate that these disparate objectives can be accomplished in workable designs.

While the descriptive examples have contained design specifications governing the maximum amounts of astigmatism and distortion which would be acceptable in a particular mirror system, it should be realized that the tolerances on these aberrations are to a degree arbitrary in their amount. I have usually imposed the tolerance of 0.50 diopters of astigmatism as the maximum to be permitted at any point in the image field. This amount of astigmatism produces a small amount of blurring. Image areas with far larger amounts of astigmatism would, nevertheless, be useful in terms of their information content. With distortion also, larger amounts than the 7½% which I have typically specified would not totally hinder the functioning of a mirror system.

However, there is no need to accept these grosser amounts of aberrations and distortions with the two-mirror systems of the types which I have described, as I have, through following the design procedures I have already explained, always been able to find system designs in which the values of S = 0.50 diopters and D = 7½5 were not exceeded. With the majority of system designs which I have worked out, the aberration values have been well within these tolerances.

By refining the design of a mirror system so that the astigmatism and distortion aberrations are, where possible, kept within limits which are smaller than those used in the specifications for the examples, the end product of the design will not be as adversely affected by those variations in the accuracies of the mirrors and their separations and anglings which will undoubtedly occur when the systems are made in production quantities. More importantly, by the reduction of the S and D values to quantities which are realistic minima with a particular design, I have found that the resulting design affords appreciably better performance, both in terms of binocular convergence properties and of latitude in head shift while maintaining good optical performance. These last mentioned qualitites have real value in terms of comfort and safety for the observer.

In summary, while I have employed optical performance tolerances which, when met, will result in system designs which are quite good, the conscientious use of my design procedure for the purpose of further improving upon the optical designs will make possible installations which will be better functionally.

EXAMPLE 8

I have successfully used my design procedure as outlined in the foregoing to develop the optical design of a two-mirror system which is similar to those in the examples here presented except that the magnification M in the direction perpendicular to the cylinder axes of the mirrors is not unity, as required for a life-size image, but has some other prescribed value. As an example of the use of my design procedure, I worked out the design of a mirror system similar to that shown in FIG. 5d, but having a magnification M of 0.50 in the horizontal direction instead of 1.00. (The figure 0.50 for the magnification means that the image field as perceived by the observer would be compressed horizontally to ½ of its true extent).

The simple change in the procedure for the optical design which accomplishes the obtaining of any desired magnification M is that of replacing the equal converging lengths $f_1$ and $f_2$ for the central ray $\gamma_C$ with a pair of converging lengths $f_1'$ and $f_2'$ for which the ratio $f_1'/f_2' = M$. (For all previous examples, unit magnification has been intended, for which requirement $f_1/f_2 = M = 1.00$). With the single exception of this change in the ratio of the converging lengths, the design work is carried out in the manner described in connection with the previous examples.

Table XV shows the excellent performance values of S and D which were achieved over a 30° object field when the specifications were the same as those of Example 3 with the exception of the magnification M.

TABLE XV

Same specifications as with Example 3, arrangement as in FIG. 5d, but with the horizontal magnification M = 0.50 instead of 1.00.

| Object field width: | 30° | |
|---|---|---|
| Image field width: | 15° | |
| Eccentricities: | $\epsilon_1 = \epsilon_2 = 1.13$ | |
| Image Field Angle $\gamma(°)$ | S diopters | D % |
| 7½ | +0.02 | −0.2 |
| −15 | 0.00 | 0.0 |
| −22½ | −0.07 | −0.9 |

The design procedure I have developed and described here is seen to handle readily those requirements where the image field is to be expanded or compressed to a given degree in one direction. The above example is another indication of the power of my optical design approach in the working out of widely varying applications of my two-mirror systems.

The basic analytical approach which I have described may be directly extended to the design and evaluation of optical systems comprised of three or more cylindrically concave mirrors. For a three-mirror system, the broad procedure involves finding the positions of the converging points such as $E_a$ and $E_b$ in FIG. 2a and the directions of the associated zero-diameter ray bundles, and then treating $E_a$ and $E_b$ as secondary object points replacing object points A and B in the ray-tracing procedure. The amounts of stigmatism and distortion in the view at the intended viewing procedure are determined in a manner analogous to that use with two-mirror systems, but extended to handle three mirror equations with their intersection points, slopes, and curvatures.

The use of my mirror systems with right-hand drive vehicles requires only that the systems as designed for left-hand drive use by reversed about a vertical plane through the central longitudinal axis of the vehicle.

If the cylinder axes of the mirrors in my two-mirror system are not at least approximately parallel to each other, the view becomes angularly deformed: that is, a right angle in the object field appears as an acute or an obtuse angle in the image field. For this reason, the mirrors should be mounted so that their cylinder axes are close enough to being truly parallel to avoid objectionable amounts of such angular deformation.

While in the examples given I have referred to the cylinder aces of the various mirror systems as being positioned either vertically or horizontally, the axes may be tilted as a unit in any direction without altering the optical properties of the system. For some applications which have the outer mirror positioned at the side of the vehicle, the cylinder axes may desirably be inclined at an angle to the vertical. Such an inclination may be useful in affording a position for the inner mirror which avoids interference with the forward vision of the vehicle operator or with the movement of his hands.

Having demonstrated in the foregoing examples that, by the use of my methods, two-mirror designs can be developed which are satisfactory while meeting the requirements for a variety of applications, I now proceed to describe how the associated concave cylindrical mirrors with specified cross-sectional curves may be produced.

METHOD FOR FORMING THE MIRRORS

As the mirrors required for a typical two-mirror system made in accordance with my invention are concavely cylindrical, and have cross sectional curves with curvatures which are continuously changing in a controlled manner from point to point, they are not commercially available and must be especially produced. The method which I have developed for use in forming the curves on the mirrors is adaptable for use with any of the variety of curve types which may be required with the different designs.

In spite of the greater technical problems involved in making mirror substrates out of glass as compared with those to be anticipated with the use of clear thermoplastic materials such as Lucite or Plexiglass, I determined upon the use of glas because of its rigidity, its lack of any tendency towards a memory type of deformation, and the superior quality of the reflective coatings which can be applied to glass surfaces.

The procedure which I adopted for the making of cylindrically curved glass mirrors accurately to design sepcifications involves heating a selected plate of flat, uniformly thick glass while it is resting upon a suitably curved and smooth refractory slab until the glass softens enough to sag into complete contact with the cylindrically concave upper surface of the slab. The curved upper surface of the glass thus formed becomes, after annealing, cooling, and the application of a "front-surface" reflective coating, the optical surface. If desired, somewhat oversized plates of glass may be used, so that any deformed edge portion from the sagging operation can be cut away.

For making the refractory slabs used in the sagging of the glass mirrors, I used a soft, formable clay material which is widely used for mold making in the ceramics industry and is known as modelling clay. A wooden forming block 3 as shown in FIG. 11 is first made for each mirror curve, the purpose of the block being to shape the associated sagging slab 4 roughly to curve. The block is made somewhat longer and wider than the clay slab required and has a cylindrical curve cut into its upper surface. This curve roughly duplicates that required for the finished mirror, with proper compensation being made for thickness of the clay slab to be shaped and of the glass mirror plate.

A portion of the clay is then formed into a slab 4 about ¾ inch thick and somewhat wider and longer than the glass plate to be sagged. The slab is placed over the curved face of the forming block 3 and pressed lightly into contact. After having air dried until it is rigid, the slab is removed from the forming block and thoroughly dried.

The slab 4 is now fired in a ceramics-type kiln at a temperature of 1500° F. while resting upon refractory supports at its ends. When the slab has been fired, cooled, and removed from the kiln it is quite stable, and, though hard, easily worn away by abrasion.

To form the fired slabs into their required precise cylindrical shapes, I devised a fixture which permitted the slabs to be shaped exactly to the contour of an accurately made curvature template. The construction of the fixture used for the shaping of the slabs will be understood from referring to FIG. 12, where 5 is a rigid steel base plate having its upper surface 6 ground flat. Two plates of tool steel 7 and 8, of appropriate width and length and about ⅛ inch thick, are fastened together sandwich-wise as shown in FIG. 13. The exact cross-sectional curve required to be formed on the concave surface of the sagging slab is now cut into a long edge of the joined steel templates by the usual toolmaking methods of laying out coordinate points which are measured from the edges of the paired plates and have been determined from the design calculations, cutting away the plates to form a rough curve, filing the curve to the final shape, and finishing the curve as accurately as patience and skill permit by honing with fine emery paper along the length of the template curve, during which honing the emery paper is backed by a suitably shaped wooden block.

At various stages during the honing of the templates, I determined their curvatures at a multitude of points along their length, using a curvature gauge in the form of an American Optical M689 Lens Measure. By comparing the curvature values so obtained with the values required by the design, I was able to control the further honing so that the curves on the templates were sufficiently precise.

The paired templates 7 and 8 are now separated and mounted in the indicated positions on the base plate surface 6. By carefully mounting the plates so that they are accurately parallel lengthwise and vertically, and so that the corresponding points on each template curve lie on a line at right angles to their long dimensions, two runner surfaces are seen to have been provided which are to serve as accurate locators for the movement of a scraper. These runners define geometrically the concave surface which is to be scraped or otherwise formed on the sagging slab 4.

The template plates 7 and 8 are clamped firmly to the base plate 5 by use of clamping blocks 9 and 10. Machine screws threaded into the template plates and into the base plate serve to hold the templates rigidly in the required positions. Six large flat headed machine bolts 11 are threaded into the base plate in the positions shown and serve as adjustable support means to hold the sagging slab without undue pressure while it is being scraped to curve. By screwing these bolts in or out of the base plate, they may be positioned to support the slab adequately. Two holes 12 and 13 are drilled towards the end of each sagging slab. As shown in FIG. 14, bolts 14 and 15 extend through these holes into the base plate. Springs 16 and 17 are placed under the bolt heads and act to cushion the fragile refractory slab against possible breakage. Tightening the bolts so as to slightly compress the springs serves to clamp the sagging slab with enough force so that it may be scraped without movement relative to the templates.

Before the scraping starts, the slab is adjusted by means of the six bolts 11 so that its upper concave surface is everywhere slightly above the cylindrical surface as defined by the two runners. After adjusting the six bolts so that each is in contact with the bottom of the surface of the slab, the clamping bolts 14 and 15 are tightened with light pressure.

The scraper 18 which I used was in the form of a 3/16 × 1¼ × 18 inches steel bar, the perfectly straight portion of one sharp edge of which was used to do the scraping.

Holding the scraping bar with one hand on each end, the bar is moved back and forth along the length of the runners while holding it roughly at right angles to their long dimension, and angling it so that its sharp, straight edge scrapes the slab material away freely. As the scraping proceeds, the edge of the bar dulls and requires to be resharpened and straightened periodically by honing with a long flat sharpening stone. The back and forth movement is continued until the scraper bar contacts both template runners along the entire length of their curved edges. Further removal of material from the sagging slab cannot occur, because the scraping bar is now fully supported by the runners and can exert no pressure on the sagging slab. In this manner, the sagging slab 4 is seen to have been provided with an accurate concave cylindrical surface whose cross sectional curve precisely matches that of the templates. The sagging slab so shaped is now ready for use as the support for a flat glass plate during the actual sagging in the kiln.

The sheet glass which is to be converted into concave cylindrical mirror blanks by sagging onto the sagging slabs should preferably be of top quality as to flatness. Plate glass is suitable, but is not readily obtainable in thicknesses less than ¼ inches. Double strength window glass and float glass sheets may be used as a substitute for plate glass but their lack of flatness will result in a degree of distortion which may be objectionable. These glasses are obtainable in ⅛ inches thickness, which is adequate for the intended purpose. The mirror blanks which I have made have mostly been produced from ⅛ inch float glass. I selected the glass before sagging in an effort to obtain reasonably flat pieces.

The glass plates are now sagged in a kiln so that they conform to the surface on the sagging slabs. FIG. 15 shows a glass plate 19 resting upon a sagging slab 20, which is in turn supported by refractory props 21 and 22, and a refractory plate 23. After scrupulously cleaning the upper surface of the sagging slab and both sides of the glass plate, the assembly shown is placed into a high-temperature kiln. Using procedures familiar to those in the ceramic and glass industries, the kiln temperature is brought up slowly to expel moisture from the sagging slab and the kiln walls, and then caused to peak for a predetermined period of time at a temperature which has been found by experience to result in the glass plate dropping into full contact with the sagging slab without having softened enough to become undesirably deformed. The plate in this condition will appear as shown schematically in FIG. 17. A temperature of 1375° F. was found to produce satisfactory results with the kiln and glass plates which I used. After cooling slowly so as to have the glass adequately annealed, the kiln is opened and cooled until the sagged glass plate can be handled without damage.

The manufacture of large quantities of duplicate cylindrical mirror surfaces which have curvatures which are satisfactorily close to those intended in the design, may better be carried out through the use of high temperature alloy steel sagging plates. Such plates are in use in the glass forming industry for making a wide variety of curved items from flat sheets of glass. For the present purpose, the sagging curves would be formed on the steel plates by shaping them through the use of NC (numerically controlled) machinery. The plates thus fashioned can be satisfactorily accurate, more durable, and relatively inexpensive in relation to ceramic sagging slabs made in accordance with the procedure I have described.

The quantity production of the mirrors which would be used in installations of my rear-view systems would require that the shapes of the mirror perimeters be well enough controlled so that they fit without alteration into their intended mounting fixtures. I have found that glass mirrors produced by the sagging method are closely reproducible. For the purpose of ease of mounting in quantity production, therefore, the mirrors may be pre-edged on production edgers of the type which is widely used in the automotive industry. Through proper allowance for their change in length and shape during the sagging operation, the mirrors can be expected to fit their intended mounts without difficulty.

The reflective surfaces to be applied to the mirror units of my device should preferrably be of the "first surface" type if the mirrors are formed of glass plates which have been sagged in the manner I have described. The use of first surface mirror coatings on both mirrors of a pair avoids the overlapping or double images which would occur with the customary rear surface coatings and which might be objectionable or even hazardous for night driving. The sagging operation often produces slight irregularities on the rear surface of a plate where it has touched the sagging slab. With the use of a first surface coating, blemishes on the rear surface or within the substrate are of no conern.

Two types of mirror coatings are useful with the mirrors of my invention. Both are widely used and are commercialbly available. The coatings are produced by vacuum deposition in high vacuum equipment, using techniques which are standard in the art.

One type has an aluminum reflective coating overlaid with a silicon monoxide-dioxide layer for protection against damage by handling and by corrosive elements in the atmosphere. The reflectivity with this type of coating is about 85% for light incident normal to the surface.

Another type of reflective coating which may be used is vacuum-deposited nichrome. Coatings of nichrome are exceptionally tough and corrosion resistant. Their reflectivity for normally incident light is about 65%, and they are accordingly usually sold as "anti-glare" mirrors.

Because the image-forming light rays in the two-mirror systems are typically incident on the mirrors at angles well away from the normals to the mirror surfaces, the reflectivity ovf the coatings will be enhanced considerably.

By using nichrome coatings on both of the two mirrors of a system, an image brightness level should result which is adequate. The outstanding durability of the nichrome coatings favors their use.

Greater brightness of the image may be obtained by the use of an aluminum coated mirror for the inside unit of a pair and retaining the use of the nichrome coating on the outside unit where the bad effects of exposure are greater.

The mirrors of my systems may be mounted in predetermined positions on their respective vehicles by adopting the use of the same basic types of supports which have been time-proven for the mounting of flat rear-view mirrors.

A suitable support means for door-mounted outer mirrors such as might be used with the installations shown in FIGS. 5a, 5b, 6, 7d, and 16, is pictured in FIG. 18, where the widely used tripod-type support structure is indicated. Struts 62 and 63 are clamped or bolted to the upper edge of the door 64. Sleeve 65, which is integral with strut 62, carries a pin 66. Strut 63 is threaded into a hole in sleeve 65 before clamping it to the door edge. The lower end of pin 66 is in the form of a serrated ball. The ball engages a socket in a boss 68 on a backing plate 69. The proper mirror 1t for the installation at hand is cemented or otherwise joined to the backing plate. Mirror 1t is positioned for height by sliding pin 66 in sleeve 65 and locked by tightening four screws which go through the boss and are threaded into clamping plate 70.

The lower support strut is comprised of the base 71 which is bolted to the door, lower rod 72 which is fastened to the base 71 and bent to suit the particular installation, telescoping tube 73 which is located along rod 72 as required and then clamped with a cone-pointed set screw, and upper rod 74, the upper end of which is threaded into the lower side of the boss on backing plate 69 and the lower end of which fits into tube 73. The assembly of the various elements is completed by adjusting the position of rod 74 in the tube 73 and locking with a cone-pointed screw.

Support means for the outer mirrors in the installations shown schematically in FIGS. 7a, 7b and 7c may be essentially the same as indicated in FIG. 18. As shown in FIG. 19, for these installations the struts 75 and 76 are fastened to the vehicle top 77 just above the windshield, and the lower sturt, again comprised of a base 78, a lower rod 79, a tube 80, and an upper rod 81, is fastened to the lower part of the left corner post 82.

The upper mirror of the mirror systems shown schematically in FIGS. 10a, 10b, 10c, and 10d may be satisfactorily supported by the use of such a mass as is illustrated in FIG. 20. The two legs of the brackets 83 are clamped to the drip molding 84 which runs along the left side of the vehicle. Pin 85 fits in a hole in the top of the bracket 83 and is adjusted to the height required to hold mirror 1v in a level position and locked with a cone-pointed set screw. Pin 85 has a socket at its top end which engages a ball on the end of the mirror bracket 86. The ball and socket joint is clamped with a set screw after the mirror 1v has been placed in position and aligned.

The right side bracket 87 is bolted to the vehicle top 88 after its required location has been determined. The upper end of bracket 87 contains a flange 89 and a shallow socket into which a serrated ball on the end of mirror bracket 90 is seated. The mirror 1v is clamped in its aligned position by tightening four screws which pass through the flange 89 and are threaded into the clamp washer 91. Prior to the alignment of the mirror 1v, sheet metal caps 92 and 93 are fastened to brackets 86 and 90 and then cemented to the ends of the mirror 1v.

For most installations, the inner mirror, such as mirror 2p of FIG. 9, (see also mirrors numbered 2c, 2d, 2e, 2f, 2g, 2h, 2j, 2k, and 2m) may be mounted with the means which is used almost exclusively today for inside rear-view mirrors: that is, with a backing plate 94 adjustably connected to a support bracket 95 through use of a ball and socket joint 96, as shown in FIG. 21. The bracket, which has a suitably large base and sufficiently rigid cross section so as to minimize vibration, is fastened in position with bolts through the top 97 of the vehicle.

This familiar support arrangement has the advantage of providing for easy adjustment of the tilt of the mirror 2w so as to center the image field at the viewing position.

With all of the installations which have been described, the outer mirrors, after their initial alignment to reflect the desired object field, are then clamped rigidly so as to maintain the required orientation.

The mounting of the inner mirrors for the installations shown in FIGS. 10a, 10b, and 10c may be carried out in much the same way as suggested for the outer mirrors and illustrated in FIG. 20 except that the brackets are fastened to the dash instead of the vehicle top, and that the ball joints on the mirror brackets are not serrated. When clamped with light pressure, the ball joints permit the inner mirrors to be adjusted in tilt around the horizontal transverse axis. This tilting of the inner mirror is the only adjustment required with the horizontal axis mirror system after the initial alignment.

The mirror 2s in the installation shown in FIG. 10d is mounted in a similar manner except that the brackets are fastened to the vehicle top and extend downwards.

The obtaining of good optical performance with a particular installation requires reasonable accuracy in the orientation of the two mirrors of a system relative to each other. For the easy alignment of a quantity of the same type of mirror pairs such as the 1x and 2x mirrors indicated in FIG. 22, an alignment template 98 is suggested. The data for the construction of the template are directly available in the form of the cross-sectional mirror surface coordinates as determined through the mathematical design procedure already described. To avoid interference from the windshield 99 and other parts of the body 100 the template will usually require a special shape, somewhat as shown.

With some types of installations, the two mirrors of a system can be mounted in a single housing in which the mirrors are fixed in their desired alignment relative to each other. FIGS. 23 and 24 show how one form of such a packaged unit might be constructed for use with an installation for a wide-bodied truck having a narrower cab of the relative width indicated in FIG. 16.

In the FIG. 23, 101 represents a housing formed of sheet metal and having ends 102 and 103 shaped as shown to support the system mirrors 1y and 2y in their intended positions after they are cemented in place. A transparent protective plate 104 is sealed to flange 105. A flanged top plate 106 as shown in FIG. 24 is sealed and fastened with screws to the upper edge of housing 101. The plte 106 is ribbed for strength and has a hub 107 containing a socket 108 about 1 inch in diameter. As shown in the cut-away portion of FIG. 25, bracket 109, which is fastened to the cab top 110, has a ball on its lower end which engages the socket 108 to form a ball joint. The length of the bracket is selected to suit the particular installation and to support the housing at the desired height. When the housing assembly 111 containing the mirrors 1y and 2y and the protective plate 104 has been tilted to place the image field in the desired position for observing, it is clamped in place by tightening the large capstan nut 112 on the end of hub 107.

For such installations, the upper part of the left side window will require to be notched to clear the protruding outer end of assembly 111.

The same type package unit with ball and socket support is also seen to be well suited for the installation of my mirror device in the large number of passenger sedans where the left corner post does not interfere with the placement of the mirror enclosure 111.

By following the optical design principles and methods set forth in the foregoing, the system configurations of FIG. 10d may be altered so as to position the lower mirror just forward of the location indicated and outside of the windshield. The curvature and anglings of both mirrors would be changed in accordance with my design principles so as to provide a satisfactorily sharp and undistorted view. Placing both mirrors outside of the windshield permits them to be mounted in fixed positions within a single sealed enclosure.

FIG. 26 shows schematically and in side elevation the manner in which a satisfactory installation of the above type may be carried out. The housing 113 may be of formed sheet metal or of adequately strong and rigid plastic. The mirrors 1z and 2z are cemented or otherwise fastened to the cylindrically shaped upper and lower portions of the housing. A transparent protective plate 114 is sealed to a flange extending around the open face of the housing. The brackets 115 and 116 shown in the figure may be shaped and sized to fit the particular vehicle body at hand. Universal brackets, adjustable for height and tilt, can be used instead of the brackets shown. Their design might be similar in principle to that of the supporting means already described and illustrated in FIG. 20, with due allowance for the additional weight and wind pressure to be carried.

Because both mirrors are outside of the passenger compartment they would, without their assembly into an enclosure of the type illustrated in FIG. 26, be exposed to road grime and corrosion which could cause a deterioration in their reflective qualities. They are also particularly subject to damage or derangement. Mounting the mirrors within a sealed housing answers these objections.

The various 2-mirror system designs and arrangements described above are illustrative of a few of the many ways in which the principles of the present invention may be applied. They are not to be interpreted as in any way limiting the scope of the invention.

What is claimed is:

1. A periscope providing an erect and unreversed view at an intended viewing position of an extended object field and comprised of a first cylindrically concave mirror, a second cylindrically concave mirror, and means supporting and positioning said mirrors so that the cylindrical axes of both mirrors are substantially parallel and said first mirror reflects light from said object field to said second mirror and said mirror reflects light from said object field and said first mirror to said intended viewing position, wherein the distortion and astigmatism in the image of said object field as formed by reflection from said first mirror only are largely removed in said view at the intended viewing position by the reflection of said image by said second mirror.

2. A periscope in accordance with claim 2 wherein the curvature of at least one of the mirrors, in cross-sections perpendicular to their cylinder axes, is continuously changing from point to point along the length of the mirror curve.

3. A periscope in accordance with claim 2 wherein the converging length of said first mirror along the ray path from a point near or at the center of said extended object field to the approximate center of said intended viewing position is substantially equal to the converging length of said second mirror along the same ray path.

4. A periscope in accordance with claim 2 wherein the converging length of said first mirror along the ray paht from a selected point near or at the center of said extended object field to the approximate center of said intended viewing position added to the converging length of said second mirror along the same ray is substantially equal to the distance between the two mirrors along the ray path.

5. A periscope in accordance with claim 4 and wherein said converging lengths of said first and second mirrors are substantially equal.

6. A periscope in accordance with claim 5 with the curves of said mirrors further controlled so as to minimize the amounts of distortion and astigmatism throughout said object field.

7. A periscope in accordance with claim 6 in which the amount of distortion in the view of object points B and A is determined by the expression:

$$D = \frac{(\gamma_B - \gamma_A) - (\alpha_B - \alpha_A)}{(\alpha_B - \alpha_A)} \times 100\%$$

where $\gamma_B - \gamma_A$ is the angle between the projected central rays from object points B and A in their paths between said second mirror and said intended viewing position and $\alpha_B - \alpha_A$ is the angle between the projected central rays from object points B and A in their paths from said object field to said first mirror, and in which the amount of astigmatism S in the view of any object point A within said object field is determined by the expression:

$$S = \frac{q_a - \frac{r_{1a} \cos \beta_{1a}}{2} - \frac{r_{2a} \cos \beta_{2a}}{2}}{\left(q_a - \frac{r_{1a} \cos \beta_{1a}}{2}\right) \frac{r_{2a} \cos \beta_{2a}}{2}} \times 1000 \text{ diopters}$$

where the subscript 1 denotes quantities associated with said first mirror, the subscript 2 denotes quantities associated with said second mirror, the subscript $a$ denotes quantities pertaining to a projected central ray from said point A, $r$ denotes the instantaneous radius of curvature of a mirror at the point of intersection of its surface with the same projected central ray, $\beta$ denotes the angle between the same projected central ray and the normal to the mirror surface at the point of intersection of the surface and the projected central ray, $q$ denotes the distance between the points of intersection of said first and second mirrors with the same projected central ray; the quantities $r$ and $q$ being measured in millimeters.

8. A periscope in accordance with claim 7 in which the quantities D and S are evaluated through the use of relationships which are based in part on the first and second derivatives of the mirror curves.

9. A periscope in accordance with claim 1 wherein the first mirror is positioned to the side of the second mirror.

10. A periscope in accordance with claim 9 and scaled and located for viewing using by the operator of a vehicle, with said means supporting and positioning the mirrors with their cylinder axes approximately vertical and in an intended spaced relationship to said vehicle.

11. A periscope in accordance with claim 10 in which the mirrors are so constructed and arranged that the leftward portion of the object field is reflected from the rightward portion of said first mirror.

12. A periscope in accordance with claim 10 and wherein the light proceeding from said object field to said second mirror travels laterally relative to the vehicle in its path between said first and second mirrors.

13. A periscope in accordance with claim 10 and in which said second mirror is located approximately centrally in front of said operator.

14. A periscope in accordance with claim 10 and wherein the positioning and supporting means for said second mirror is adjustable about an axis substantially parallel to the cylinder axis of said second mirror for the purpose of permitting the operator to see the full extent of said view while maintaining a comfortable position.

15. A periscope in accordance with claim 10 and wherein said first mirror is also positioned forwardly of a side edge of the vehicle windshield and light proceeding from said object field to said second mirror travels through the windshield in its path between said first and second mirrors.

16. A periscope in accordance with claim 10 and wherein said first and second mirrors and said means supporting and positioning the mirrors are housed in a single enclosure which may be sealed against the entry of materials damaging to the reflections from said mirrors and which is intended for fastening to a part of the vehicle structure.

17. The combination of a periscope in accordance with claim 10 in which the mirrors are so constructed and arranged that said view is of an object field to the rearward and mainly to the left with another such periscope in which said view is of an object field to the rearward and mainly to the right.

18. A periscope in accordance with claim 17 in which said object field to the rearward and mainly to the left is reflected by a first mirror which is to the left side of a cooperating second mirror and said object field to the rearward and mainly to the right is reflected by another first mirror which is to the right side of another cooperating second mirror.

19. A periscope in accordance with claim 1 wherein the magnification in the view direction which is perpendicular to the cylinder axes of the mirrors has a prescribed value and is substantially constant, the magnification in the view direction parallel to the cylinder axes is substantially unity.

* * * * *

UNITED STATES PATENT OFFICE
CERTIFICATE OF CORRECTION

PATENT NO. : 4,033,678
DATED : July 5, 1977
INVENTOR(S) : Milo O. Rudd

It is certified that error appears in the above-identified patent and that said Letters Patent are hereby corrected as shown below:

Column 3, line 42, "to" should be --To--;

Column 7, lines 37 & 38, "generally" should be --generality--;

Column 8, line 62, delete "2 centered" second occurrence;

Column 9, line 29, before "will" insert --and--;

Column 11, line 32, "$\frac{s^2}{a_2^2}$" should be -- $\frac{s^2}{a_2^2}$ --;

Column 12, line 44, "Table II" should be --Table III--;

Column 15, line 15, after "astigmatism" insert --and--;

Column 19, line 26, "was" should be --as--:

Column 20, line 27, "received" should be --receive--;

Column 20, line 58, ";" should be --:--;

Column 25, line 29, "and" second occurrence should be --are--;

UNITED STATES PATENT OFFICE
CERTIFICATE OF CORRECTION

PATENT NO. : 4,033,678
DATED : July 5, 1977
INVENTOR(S) : Milo O. Rudd

It is certified that error appears in the above-identified patent and that said Letters Patent are hereby corrected as shown below:

Column 27, line 27, "7 1/2" should be -- -7 1/2 --;

Column 27, line 46, "stigmatism" should be --astigmatism--;

Column 27, line 47, "procedure" should be --position--:

Column 27, line 65, "aces" should be --axes--;

Column 28, line 32, "glas" should be --glass--;

Column 31, line 56, "ovp" should be --of--;

Column 32, line 41, "mass" should be --means--;

Column 33, line 56, "plte" should be --plate--; and

Column 34, line 56, "said second mirror and said mirror" should be --said second mirror and said second mirror--.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

PATENT NO. : 4,033,678
DATED : July 5, 1977
INVENTOR(S) : MOLO O. RUDD

It is certified that error appears in the above-identified patent and that said Letters Patent are hereby corrected as shown below:

Column 34, line 64, "claim 2" should be --claim 1--.

Column 35, line 1, "claim 2" should be --claim 1--.

Column 35, line 7, "claim 2" should be --claim 1--.

Signed and Sealed this

Third Day of January 1978

[SEAL]

Attest:

RUTH C. MASON
Attesting Officer

LUTRELLE F. PARKER
Acting Commissioner of Patents and Trademarks